(12) United States Patent
Chae et al.

(10) Patent No.: US 9,461,479 B2
(45) Date of Patent: Oct. 4, 2016

(54) WIRELESS POWER TRANSMITTER AND WIRELESS POWER TRANSFER METHOD THEREOF

(71) Applicant: LG ELECTRONICS INC., Seoul (KR)

(72) Inventors: Beomseok Chae, Seoul (KR); Byungsang Jung, Seoul (KR); Jeongkyo Seo, Seoul (KR); Kwangmin Yoo, Yongin-si (KR); Junyoung Lee, Yongin-si (KR)

(73) Assignee: LG ELECTRONICS INC., Seoul (KR)

( * ) Notice: Subject to any disclaimer, the term of this patent is extended or adjusted under 35 U.S.C. 154(b) by 167 days.

(21) Appl. No.: 14/286,672

(22) Filed: May 23, 2014

(65) Prior Publication Data

US 2014/0347008 A1    Nov. 27, 2014

(30) Foreign Application Priority Data

May 27, 2013 (KR) .................. 10-2013-0059894

(51) Int. Cl.
| | |
|---|---|
| H01M 10/44 | (2006.01) |
| H01M 10/46 | (2006.01) |
| H02J 5/00 | (2016.01) |
| H02J 7/02 | (2016.01) |
| H02J 17/00 | (2006.01) |
| H02J 7/00 | (2006.01) |

(52) U.S. Cl.
CPC .............. *H02J 5/005* (2013.01); *H02J 7/0081* (2013.01); *H02J 7/0093* (2013.01); *H02J 7/025* (2013.01); *H02J 17/00* (2013.01); *H02J 2007/0096* (2013.01)

(58) Field of Classification Search
CPC ................................. H02J 5/005; H02J 7/025
USPC ......................................................... 320/108
See application file for complete search history.

(56) References Cited

U.S. PATENT DOCUMENTS

| | | |
|---|---|---|
| 2007/0059957 A1 | 3/2007 | Choi |
| 2014/0203774 A1* | 7/2014 | Sawayanagi .......... H02J 7/0004 320/108 |
| 2015/0236539 A1 | 8/2015 | Park et al. |

FOREIGN PATENT DOCUMENTS

| | | | |
|---|---|---|---|
| CN | 1941547 A | 4/2007 | |
| CN | 102593883 A | 7/2012 | |
| WO | WO 2011/156768 A2 | 12/2011 | |
| WO | WO 2013/046391 A1 | 4/2013 | |
| WO | WO 2013046391 A1 * | 4/2013 | ............ H02J 7/0004 |

* cited by examiner

*Primary Examiner* — Richard Isla Rodas
*Assistant Examiner* — Tikisha Slan
(74) *Attorney, Agent, or Firm* — Birch, Stewart, Kolasch & Birch, LLP

(57) ABSTRACT

A wireless power transmitter including a power supply unit configured to supply an input voltage; a power conversion unit configured to generate wireless power based on a driving signal, generated by the supplied input voltage and a first pulse width modulation (PWM) signal, and transfer the wireless power to a wireless power receiver; and a power transmission control unit configured to receive a voltage value of a battery charged with the wireless power through a wireless network, and generate the first PWM signal based on the voltage value of the battery.

18 Claims, 24 Drawing Sheets

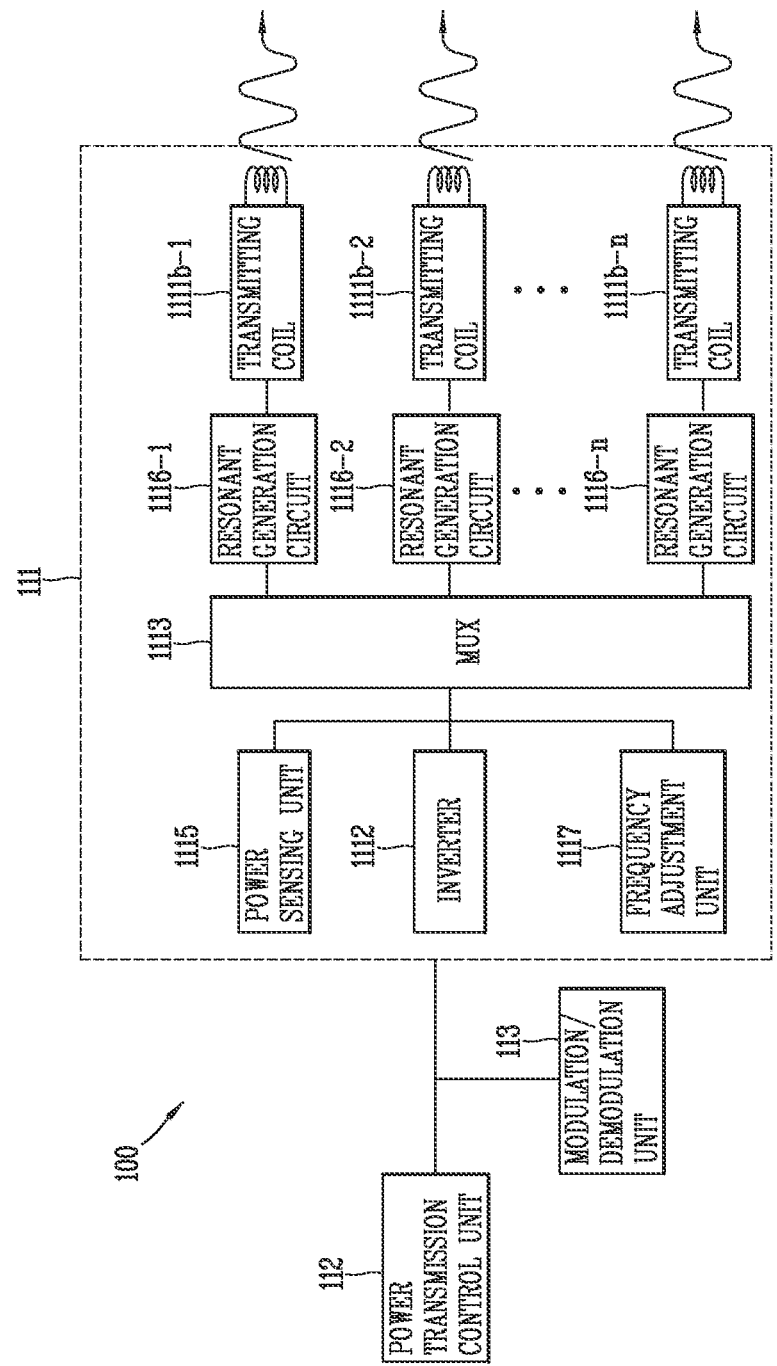

|    | b7 | b6 | b5 | b4 | b3 | b2 | b1 | b0 |
|----|----|----|----|----|----|----|----|----|
| B0 | HEADER (5620) ||||||||
| B1 | END POWER TRANSFER CODE (5630) ||||||||

WIRELESS POWER TRANSMITTER AND WIRELESS POWER TRANSFER METHOD THEREOF

CROSS-REFERENCE TO A RELATED APPLICATION

This application claims the benefit of priority of Korean Patent Application No. 10-2013-0059894, filed on May 27, 2013, which is herein expressly incorporated by reference in their entireties.

BACKGROUND OF THE INVENTION

1. Field of the Invention

The present invention relates to a wireless power transmitter, and a wireless power transfer method thereof.

2. Description of the Related Art

In recent years, the method of contactlessly supplying electrical energy to electronic devices in a wireless manner has been used instead of the traditional method of supplying electrical energy in a wired manner. The electronic device receiving energy in a wireless manner may be directly driven by the received wireless power, or a battery may be charged by using the received wireless power, then allowing the electronic device to be driven by the charged power.

SUMMARY OF THE INVENTION

In accordance with the embodiments disclosed herein, there is provided a wireless power transmitter including a power supply unit that supplies an input voltage, a power conversion unit that generates power in a wireless manner based on a driving signal, which is generated by the supplied input voltage and a first pulse width modulation (first PWM) signal, and transfers the power to a wireless power receiver in the wireless manner, and a power transmission control unit that applies the driving signal to the power conversion unit. Here, the power transmission control unit can receive a voltage value of a battery, charged with the wireless power, through a wireless network, and generate the first PWM signal based on the voltage value of the battery.

In accordance with one embodiment disclosed herein, the power transmission control unit can generate an input current reference value based on the voltage value of the battery, a reference current value for charging the battery, and the input voltage value, generate a battery charging current value for compensating for a difference between the input current reference value and an input current value, and generate the first PWM signal based on the battery charging current value.

In accordance with one embodiment disclosed herein, the power transmission control unit can generate the first PWM signal in a battery charging mode.

In accordance with one embodiment disclosed herein, the power transmission control unit may calculate the input current reference value by multiplying the voltage value of the battery and the reference current value for charging the battery, and dividing the multiplied value by the input voltage value.

In accordance with one embodiment disclosed herein, the power transmission control unit may include a wireless reception module that receives the voltage value of the battery, charged with the wireless power, in real time through a wireless network, an input current reference value generator that generates the input current reference value based on the voltage value of the battery, the reference current value for charging the battery and the input voltage, a first current controller that compares the input current reference value with a currently-measured input current value and decide the battery charging current value for compensating for a difference according to the comparison result, and a first PWM signal generator that generates the first PWM signal corresponding to the battery charging current value and apply the first PWM signal as the driving signal to the power conversion unit.

In accordance with one embodiment disclosed herein, the power transmission control unit may further include a wireless transmission module that transmits the voltage value of the battery to the wireless reception module, a second current generator that compares the reference current value of the battery with a currently-measured current value of the battery and decide a battery discharging current value for compensating for a difference according to the comparison result, and a second PWM signal generator that generates a second PWM signal corresponding to the battery discharging current value and applies the second PWM signal as the driving signal to the power conversion unit of the wireless power receiver.

In accordance with one embodiment disclosed herein, the power transmission control unit can generate the second PWM signal in a battery discharging mode.

In accordance with one embodiment disclosed herein, there is provided a wireless power transfer method including receiving a voltage value of a battery of a wireless power receiver through a wireless network, generating a first pulse width modulation (PWM) signal based on the voltage value of the battery, generating power in a wireless manner based on a driving signal by an input voltage and the first PWM signal, and transferring the wireless power to the wireless power receiver.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a block diagram illustrating a wireless power transmitter configured to have one or more transmission coils receiving power according to a resonance coupling method that can be employed in the embodiments disclosed herein;

DETAILED DESCRIPTION OF THE INVENTION

Figure 1:
FIG. 1 is an overview illustrating a wireless power transmitter and an electronic device according to the embodiments of the present invention.

The technologies disclosed herein are applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

FIG. 1 is a view conceptually illustrating a wireless power transmitter 100 and an electronic device 200 according to the embodiments of the present invention. Referring to FIG. 1, the wireless power transmitter 100 may be a power transfer apparatus configured to transfer power required for the electronic device 200 in a wireless manner.

Furthermore, the wireless power transmitter 100 may be a wireless charging apparatus configured to charge a battery of the electronic device 200 by transferring power in a wireless manner. When the wireless power transmitter 100 is a wireless charging apparatus will be described later with reference to FIG. 9.

Additionally, the wireless power transmitter 100 may be implemented with various forms of apparatuses transferring power to the electronic device 200 requiring power in a contactless state. Further, the electronic device 200 is a device that is operable by receiving power from the wireless power transmitter 100 in a wireless manner. Furthermore, the electronic device 200 may charge a battery using the received wireless power.

Further, an electronic device for receiving power in a wireless manner as described herein includes a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The electronic device 200, as described later, may be a mobile communication terminal, (for example, a portable phone, a cellular phone, and a tablet or multimedia device). When the electronic device is a mobile terminal, it will be described later with reference to FIG. 10.

Further, the wireless power transmitter 100 may transfer power in a wireless manner without mutual contact to the electronic device 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the electronic device 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and electronic device 200 according to the embodiments disclosed herein will be described in detail. In assigning reference numerals to the constituent elements in each of the following drawings, the same reference numerals will be used for the same constituent elements even though they are shown in a different drawing.

Figure 2A:
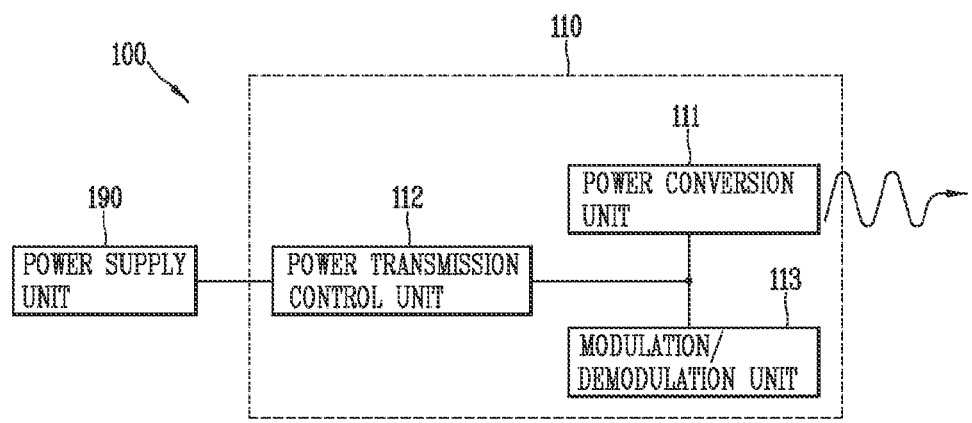
FIGS. 2A and 2B are block diagrams illustrating the configuration of a wireless power transmitter and an electronic device that can be employed in the embodiments disclosed herein, respectively.
Figure 2B:
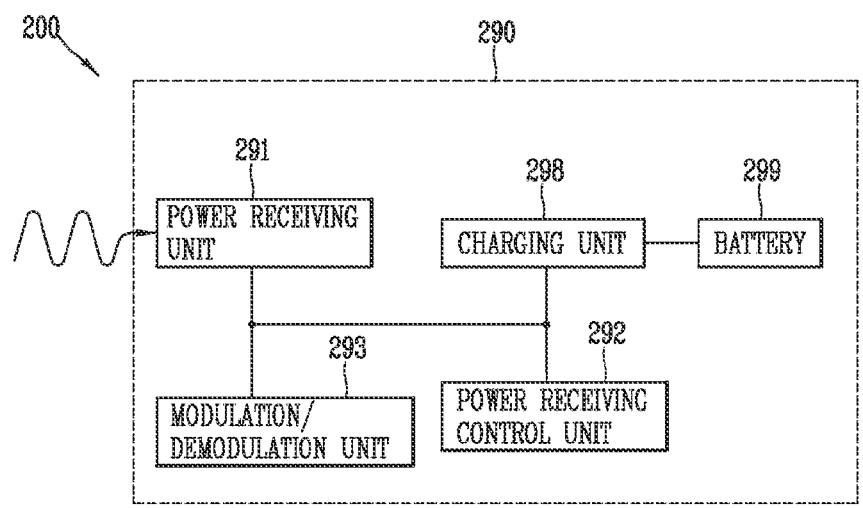

FIGS. 2A and 2B are block diagrams illustrating the configuration of a wireless power transmitter 100 and an electronic device 200 that can be employed in the embodiments disclosed herein, respectively. Referring to FIG. 2A, the wireless power transmitter 100 includes a power transmission unit 110, and the power transmission unit 110 includes a power conversion unit 111 and a power transmission control unit 112.

The power conversion unit 111 transfers power supplied from a transmission side power supply unit 190 to the electronic device 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal. Further, the power conversion unit 111 may include a constituent element for generating a different type of wireless power signal according to each power transfer method.

In accordance with embodiments, the power conversion unit 111 may include a primary coil for forming a changing magnetic field to induce a current to a secondary coil of the electronic device 200. Furthermore, the power conversion unit 111 may include a coil (or antenna) for forming a magnetic field having a specific resonant frequency to generate a resonant frequency in the electronic device 200 according to the resonance coupling method.

In addition, the power conversion unit 111 may transfer power using at least one of the foregoing inductive coupling method and the resonance coupling method. Among the constituent elements included in the power conversion unit 111, those for the inductive coupling method will be described later with reference to FIGS. 4 and 5, and those for the resonance coupling method will be described with reference to FIGS. 7 and 8.

Further, the power conversion unit 111 may further include a circuit for controlling the characteristics of a used frequency, an applied voltage, an applied current or the like to form the wireless power signal. The power transmission control unit 112 controls each of the constituent elements included in the power transmission unit 110. The power transmission control unit 112 may be implemented to be integrated into another control unit for controlling the wireless power transmitter 100.

Further, a region to which the wireless power signal can be approached may be divided into two types. First, an active area denotes a region through which a wireless power signal transferring power to the electronic device 200 is passed. Next, a semi-active area denotes an interest region in which the wireless power transmitter 100 can detect the existence of the electronic device 200. Here, the power transmission control unit 112 may detect whether the electronic device 200 is placed in the active area or detection area or removed from the area.

Specifically, the power transmission control unit 112 may detect whether or not the electronic device 200 is placed in the active area or detection area using a wireless power signal formed from the power conversion unit 111 or a sensor separately provided therein. For instance, the power transmission control unit 112 may detect the presence of the electronic device 200 by monitoring whether or not the characteristic of power for forming the wireless power signal is changed by the wireless power signal, which is affected by the electronic device 200 existing in the detection area. However, the active area and detection area may vary according to the wireless power transfer method such as an inductive coupling method, a resonance coupling method, and the like.

The power transmission control unit 112 may perform the process of identifying the electronic device 200 or determine whether to start wireless power transfer according to a result of detecting the existence of the electronic device 200. Furthermore, the power transmission control unit 112 can determine at least one characteristic of a frequency, a voltage, and a current of the power conversion unit 111 for forming the wireless power signal.

The determination of the characteristic may be performed by a condition at the side of the wireless power transmitter 100 or a condition at the side of the electronic device 200. In embodiments, the power transmission control unit 112 may decide the characteristic based on device identification information.

In another embodiment, the power transmission control unit 112 may decide the characteristic based on required power information of the electronic device 200 or profile information related to the required power. The power transmission control unit 112 can receive a power control message from the electronic device 200. The power transmission control unit 112 can determine at least one characteristic of a frequency, a voltage and a current of the power conversion unit 111 based on the received power control message, and additionally perform other control operations based on the power control message.

For example, the power transmission control unit 112 can determine at least one characteristic of a frequency, a voltage and a current used to form the wireless power signal according to the power control message including at least one of rectified power amount information, charging state information and identification information in the electronic device 200.

The power transmission control unit 112 may execute scanning of frequencies within a preset range by controlling the power conversion unit 111, in order to acquire frequency-based power transfer information relating to wireless power receivers which are located within the active area or the semi-active area. In more detail, the scanning refers to an operation or method of checking the changes of the power transfer information in response to the change of a frequency of a wireless power signal. For example, the scanning may refer to an operation in which the wireless power transmitter 100 sequentially transmits wireless power signals having different frequencies and receives power transfer information corresponding to each of the sequentially-transmitted wireless power signals.

The power transfer information may include information related to at least one of a receiving-side voltage of the wireless power receiver, a receiving-side current of the wireless power receiver, a first reference voltage and a second reference voltage. Here, the first reference voltage may be decided based on whether or not it is a voltage which is likely to cause damage on the wireless power receiver. The second reference voltage may be decided based on whether or not it is a voltage to receive power from the wireless power transmitter in a wireless manner.

Furthermore, as another control operation using the power control message, the wireless power transmitter 100 may perform a typical control operation associated with wireless power transfer based on the power control message. For example, the wireless power transmitter 100 can receive information associated with the electronic device 200 to be auditorily or visually output through the power control message, or receive information required for authentication between devices.

In embodiments, the power transmission control unit 112 can receive the power control message through the wireless power signal. In other embodiment, the power transmission control unit 112 can receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the electronic device 200 and use it to receive the power control message.

The method for allowing the power conversion unit 111 to receive a power control message using a wireless power signal will be described later with reference to FIGS. 11 through 13. In addition, the power transmission control unit 112 may acquire a power control message by receiving user data including a power control message by a communication mechanism included in the wireless power transmitter 100.

Referring to FIG. 2B, the electronic device 200 includes a power supply unit 290, and the power supply unit 290 supplies power required for the operation of the electronic device 200. The power supply unit 290 also includes a power receiving unit 291 and a power reception control unit (or POWER RECEIVING CONTROL UNIT) 292.

The power receiving unit 291 receives power transferred from the wireless power transmitter 100 in a wireless manner. Further, the power receiving unit 291 may include constituent elements required to receive the wireless power signal according to a wireless power transfer method. In addition, the power receiving unit 291 can receive power according to at least one wireless power transfer method, and in this instance, the power receiving unit 291 may include constituent elements required for each method.

First, the power receiving unit 291 may include a coil for receiving a wireless power signal transferred in the form of a magnetic field or electromagnetic field having a vibration characteristic. For instance, as a constituent element according to the inductive coupling method, the power receiving unit 291 may include a secondary coil to which a current is induced by a changing magnetic field. In embodiments, the power receiving unit 291, as a constituent element according to the resonance coupling method, may include a coil and a resonant circuit in which resonance phenomenon is generated by a magnetic field having a specific resonant frequency.

In another embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIG. 4, and those for the resonance coupling method with reference to FIG. 7. Further, the power receiving unit 291 may further include a rectifier and a regulator to convert the wireless power signal into a direct current. Also, the power receiving unit 291 may further include a circuit for protecting an overvoltage or overcurrent from being generated by the received power signal.

The power receiving control unit 292 can control each constituent element included in the power supply unit 290. Specifically, the power receiving control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In embodiments, the power receiving control unit 292 can transmit the power control message through the wireless power signal. In another embodiment, the power receiving control unit 292 can transmit the power control message through a method for transmitting user data.

In order to transmit the foregoing power control message, the electronic device 200 may further include a modulation/demodulation unit 293 electrically connected to the power receiving unit 291. The modulation/demodulation unit 293, similarly to the case of the wireless power transmitter 100, may be used to transmit the power control message through the wireless power signal.

The modulation/demodulation unit 293 may be used as a means for controlling a current and/or voltage flowing through the power conversion unit 111 of the wireless power transmitter 100. Hereinafter, a method for allowing the modulation/demodulation unit 113 or 293 at the side of the wireless power transmitter 100 and at the side of the electronic device 200, respectively, to be used to transmit and receive a power control message through a wireless power signal will be described.

A wireless power signal formed by the power conversion unit 111 is received by the power receiving unit 291. At this time, the power receiving control unit 292 controls the modulation/demodulation unit 293 at the side of the electronic device 200 to modulate the wireless power signal. For instance, the power receiving control unit 292 may perform a modulation process such that a power amount received from the wireless power signal is varied by changing a reactance of the modulation/demodulation unit 293 connected to the power receiving unit 291.

The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power receiving control unit 292 can generate a packet including a power control message intended to be transferred to the wireless power transmitter 100 and modulate the wireless power signal to allow the packet to be included therein, and the power transmission control unit 112 can decode the packet based on a result of performing the demodulation process of the modulation/demodulation unit 113 to acquire the power control message included in the packet. The detailed method of allowing the wireless power transmitter 100 to acquire the power control message will be described later with reference to FIGS. 11 through 13.

In addition, the power receiving control unit 292 can transmit a power control message to the wireless power transmitter 100 by transmitting user data including the power control message by a communication mechanism included in the electronic device 200. Further, the power supply unit 290 may further include a charging unit 298 and a battery 299.

The electronic device 200 receiving power for operation from the power supply unit 290 can be operated by power transferred from the wireless power transmitter 100, or operated by charging the battery 299 using the transferred power and then receiving the charged power. At this time, the power receiving control unit 292 can control the charging unit 298 to perform charging using the transferred power.

Hereinafter, a wireless power transmitter and an electronic device applicable to the embodiments disclosed herein will be described. First, a method of allowing the wireless power transmitter to transfer power to the electronic device according to the inductive coupling method will be described with reference to FIGS. 3 through 5.

Figure 3:
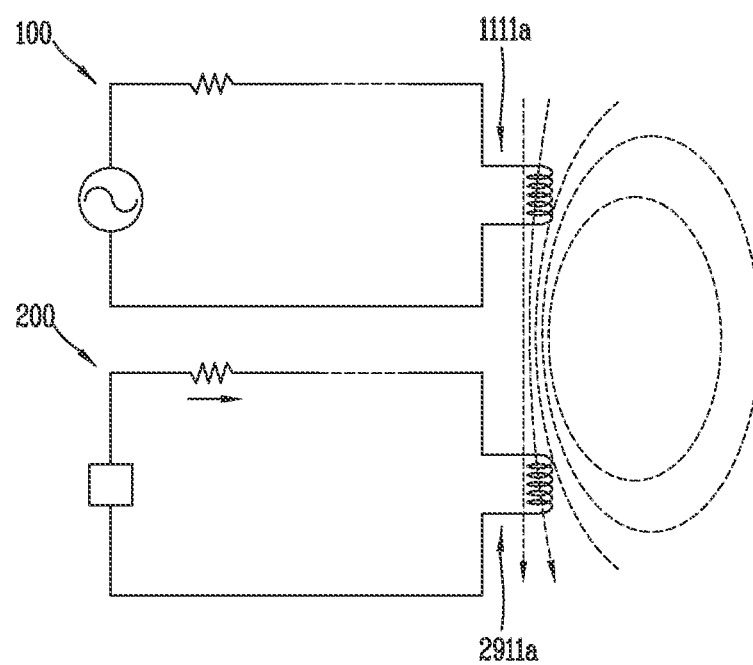
FIG. 3 is a view illustrating a concept in which power is transferred from a wireless power transmitter to an electronic device in a wireless manner according to an inductive coupling method.

In particular, FIG. 3 is a view illustrating a concept in which power is transferred from a wireless power transmitter to an electronic device in a wireless manner according to an inductive coupling method. When the power of the wireless power transmitter 100 is transferred in an inductive coupling method, if the strength of a current flowing through a primary coil within the power transmission unit 110 is changed, then a magnetic field passing through the primary coil may be changed by the current. The changed magnetic field generates an induced electromotive force at a secondary coil in the electronic device 200.

According to the foregoing method, the power conversion unit 111 of the wireless power transmitter 100 may include a transmitting (Tx) coil 1111a being operated as a primary coil in magnetic induction. Furthermore, the power receiving unit 291 of the electronic device 200 may include a receiving (Rx) coil 2911a being operated as a secondary coil in magnetic induction.

First, the wireless power transmitter 100 and electronic device 200 are disposed so the transmitting coil 1111a at the side of the wireless power transmitter 100 and the receiving coil at the side of the electronic device 200 are located adjacent to each other. Then, if the power transmission control unit 112 controls a current of the transmitting coil 1111a to be changed, the power receiving unit 291 controls power to be supplied to the electronic device 200 using an electromotive force induced to the receiving coil 2911a.

The efficiency of wireless power transfer by the inductive coupling method may be little affected by a frequency characteristic, but affected by an alignment and distance between the wireless power transmitter 100 and the electronic device 200 including each coil.

Further, in order to perform wireless power transfer in the inductive coupling method, the wireless power transmitter 100 may be configured to include an interface surface in the form of a flat surface. One or more electronic devices may be placed at an upper portion of the interface surface, and the transmitting coil 1111a may be mounted at a lower portion of the interface surface. In this instance, a vertical spacing is formed in a small-scale between the transmitting coil 1111a mounted at a lower portion of the interface surface and the receiving coil 2911a of the electronic device 200 placed at an upper portion of the interface surface, and thus a distance between the coils becomes sufficiently small to efficiently implement contactless power transfer by the inductive coupling method.

Furthermore, an alignment indicator indicating a location where the electronic device 200 is to be placed is at an upper portion of the interface surface. The alignment indicator indicates a location of the electronic device 200 where an alignment between the transmitting coil 1111a mounted at a lower portion of the interface surface and the receiving coil 2911a can be suitably implemented.

In addition, the alignment indicator may alternatively be simple marks, or may be formed in the form of a protrusion structure for guiding the location of the electronic device 200. Otherwise, the alignment indicator may include a magnetic body such as a magnet mounted at a lower portion of the interface surface, thereby guiding the coils to be suitably arranged by mutual magnetism to a magnetic body having an opposite polarity mounted within the electronic device 200.

Further, the wireless power transmitter 100 may include one or more transmitting coils. The wireless power transmitter 100 may selectively use some of coils suitably arranged with the receiving coil 2911a of the electronic device 200 among the one or more transmitting coils to enhance the power transmission efficiency. The wireless power transmitter 100 including the one or more transmitting coils will be described later with reference to FIG. 5.

Figure 4A:
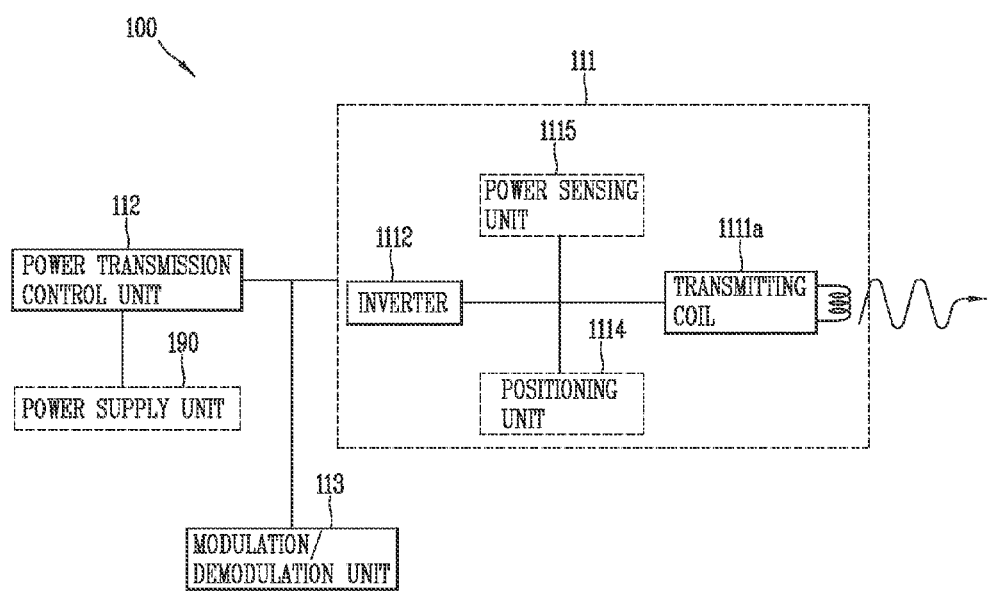
FIGS. 4A and 4B are block diagrams illustrating part of a wireless power transmitter and an electronic device in a magnetic induction method that can be employed in the embodiments disclosed herein.
Figure 4B:
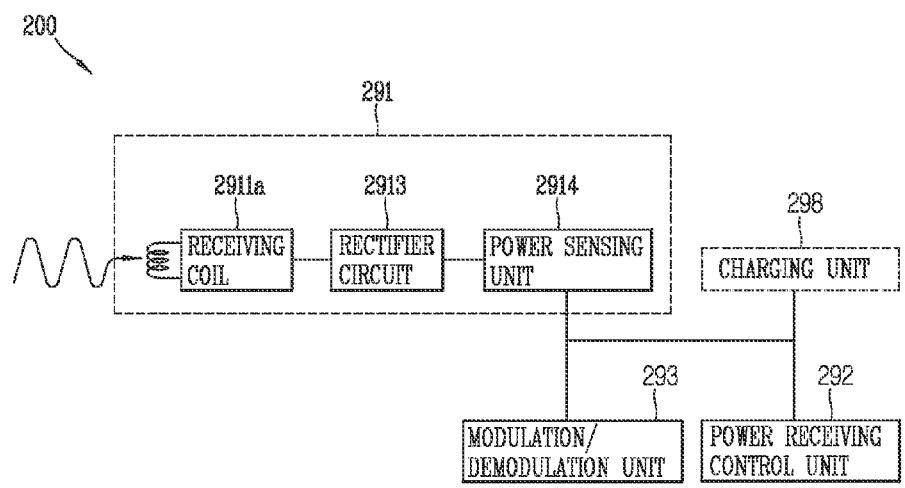

Hereinafter, a configuration of the wireless power transmitter and electronic device using an inductive coupling method applicable to the embodiments disclosed herein will be described in detail. In particular, FIGS. 4A and 4B are block diagrams illustrating part of the wireless power transmitter 100 and the electronic device 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the electronic device 200 will be described with reference to FIG. 4B.

Referring to FIG. 4A, the power conversion unit 111 of the wireless power transmitter 100 includes a transmitting (Tx) coil 1111a and an inverter 1112. The transmitting coil 1111a can form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor to form a magnetic field in the transmitting coil 1111a. In response to the formation of the magnetic field, the wireless power signal may be transferred from the wireless power transmitter 100 to the wireless power receiver 200.

In accordance with one embodiment, the AC waveform generated from the inverter 1112 may be a carrier signal, which can drive a resonant circuit such that the wireless power signal can be generated from the transmitting coil 1111a. That is, the wireless power signal may be generated based on the carrier signal.

In addition, the power conversion unit 111 may further include a positioning unit 1114. The positioning unit 1114 can move or rotate the transmitting coil 1111a to enhance the effectiveness of contactless power transfer using the inductive coupling method. As described above, this is because an alignment and distance between the wireless power transmitter 100 and the electronic device 200 including a primary coil and a secondary coil may affect power transfer using the inductive coupling method. In particular, the positioning unit 1114 can be used when the electronic device 200 does not exist within an active area of the wireless power transmitter 100.

Accordingly, the positioning unit 1114 may include a drive unit for moving the transmitting coil 1111a such that a center-to-center distance of the transmitting coil 1111a of the wireless power transmitter 100 and the receiving coil 2911a of the electronic device 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit made of a sensor for detecting the location of the electronic device 200, and the power transmission control unit 112 can control the positioning unit 1114 based on the location information of the electronic device 200 received from the location detection sensor.

In addition, the power transmission control unit 112 can receive control information on an alignment or distance to the electronic device 200 through the modulation/demodulation unit 113, and control the positioning unit 1114 based on the received control information on the alignment or distance.

If the power conversion unit 111 includes a plurality of transmitting coils, then the positioning unit 1114 can determine which one of the plurality of transmitting coils is to be used for power transmission. The configuration of the wireless power transmitter 100 including the plurality of transmitting coils will be described later with reference to FIG. 5.

Also, the power conversion unit 111 may further include a power sensing unit 1115. The power sensing unit 1115 at the side of the wireless power transmitter 100 monitors a current or voltage flowing into the transmitting coil 1111a. In more detail, the power sensing unit 1115 is provided to check whether or not the wireless power transmitter 100 is normally operated, and thus the power sensing unit 1115 can detect a voltage or current of the power supplied from the outside, and check whether the detected voltage or current exceeds a threshold value.

The power sensing unit 1115 may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 can control a switching unit to cut off power applied to the transmitting coil 1111a.

Referring to FIG. 4B, the power supply unit 290 of the electronic device 200 may include a receiving (Rx) coil 2911a and a rectifier generation circuit 2913. A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be connected to the receiving coil 2911a to enhance the effectiveness of wireless power reception or perform resonant detection. The receiving coil 2911a may be a single coil or a plurality of coils.

In addition, the rectifier generation circuit 2913 performs a full-wave rectification to a current to convert alternating current into direct current. The rectifier generation circuit 2913, for instance, may be implemented with a full-bridge rectifier generation circuit made of four diodes or a circuit using active components.

In addition, the rectifier generation circuit 2913 may further include a regulator circuit for converting a rectified current into a more flat and stable direct current. Furthermore, the output power of the rectifier generation circuit 2913 is supplied to each constituent element of the power supply unit 290. The rectifier generation circuit 2913 may further include a DC-DC converter for converting output DC power into a suitable voltage to adjust it to the power required for each constituent element (for instance, a circuit such as a charging unit 298).

In addition, the modulation/demodulation unit 293 may be connected to the power receiving unit 291, and include a resistive element in which resistance varies with respect to direct current, and may include a capacitive element in which reactance varies with respect to alternating current. The power receiving control unit 292 can change the resistance or reactance of the power communications modulation/demodulation unit 293 to modulate a wireless power signal received to the power receiving unit 291.

Further, the power supply unit 290 may further include a power sensing unit 2914. The power sensing unit 2914 at the side of the electronic device 200 monitors a voltage and/or current of the power rectified by the rectifier generation circuit 2913, and if the voltage and/or current of the rectified power exceeds a threshold value as a result of monitoring, then the power receiving control unit 292 transmits a power control message to the wireless power transmitter 100 to transfer suitable power.

Figure 5:
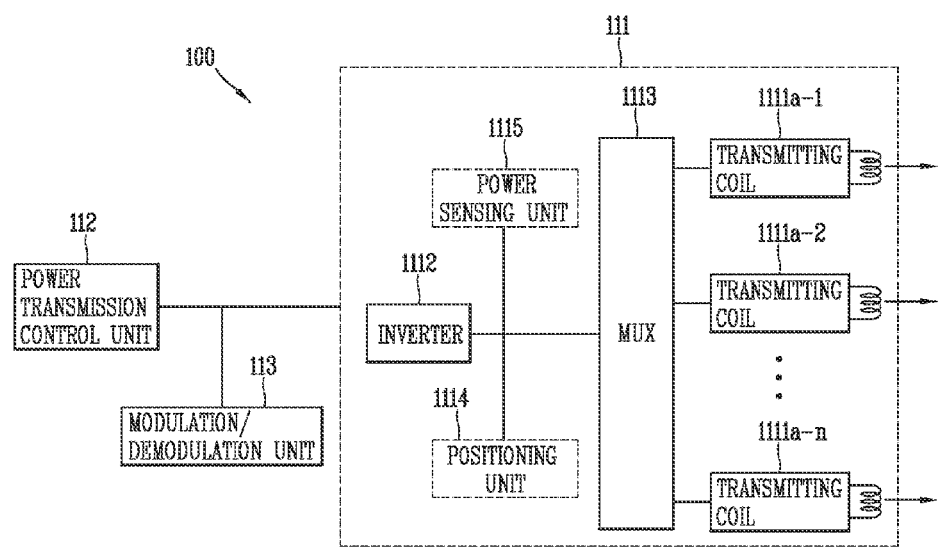
FIG. 5 is a block diagram illustrating a wireless power transmitter configured to have one or more transmission coils receiving power according to an inductive coupling method that can be employed in the embodiments disclosed herein.

Next, FIG. 5 is a block diagram illustrating a wireless power transmitter including one or more transmission coils receiving power according to an inductive coupling method that can be employed in the embodiments disclosed herein. Referring to FIG. 5, the power conversion unit 111 of the wireless power transmitter 100 according to the embodiments disclosed herein may include one or more transmitting coils 1111a-1 to 1111a-n.

The transmitting coils 1111a-1 to 1111a-n may be an array of partly overlapping primary coils. An active area may be determined by some of the one or more transmitting coils. The transmitting coils 1111a-1 to 1111a-n may also be mounted at a lower portion of the interface surface. In addition, the power conversion unit 111 may further include a multiplexer 1113 for establishing and releasing the connection of some of the transmitting coils 1111a-1 to 1111a-n.

Upon detecting the location of the electronic device 200 placed at an upper portion of the interface surface, the power transmission control unit 112 can take the detected location of the electronic device 200 into consideration to control the multiplexer 1113, thereby allowing coils that can be placed in an inductive coupling relation to the receiving coil 2911a of the electronic device 200 among the transmitting coils 1111a-1 to 1111a-n to be connected to one another.

For this purpose, the power transmission control unit 112 can acquire the location information of the electronic device 200. For example, the power transmission control unit 112 can acquire the location of the electronic device 200 on the interface surface by the location detection unit provided in the wireless power transmitter 100.

In another example, the power transmission control unit 112 can alternatively receive a power control message indicating a strength of the wireless power signal from an object on the interface surface or a power control message indicating the identification information of the object using the transmitting coils 1111a-1 to 1111a-n, respectively, and determines whether it is located adjacent to which one of the one or more transmitting coils based on the received result, thereby acquiring the location information of the electronic device 200.

Further, the active area as part of the interface surface denotes a portion through which a magnetic field with a high efficiency can pass when the wireless power transmitter 100 transfers power to the electronic device 200 in a wireless manner. A single transmitting coil or one or a combination of more transmitting coils forming a magnetic field passing through the active area may be designated as a primary cell.

Accordingly, the power transmission control unit 112 can determine an active area based on the detected location of the electronic device 200, and establish the connection of a primary cell corresponding to the active area to control the multiplexer 1113, thereby allowing the receiving coil 2911a of the electronic device 200 and the coils belonging to the primary cell to be placed in an inductive coupling relation.

Further, upon disposing one or more electronic devices 200 on an interface surface of the wireless power transmitter 100, which includes the transmitting coils 1111a-1 to 1111a-n, the power transmission control unit 112 can control the multiplexer 1113 to allow the coils belonging to the primary cell corresponding to the position of each electronic device to be placed in the inductive coupling relation. Accordingly, the wireless power transmitter 100 can generate the wireless power signal using different coils, thereby transferring it to the one or more electronic devices in a wireless manner.

Also, the power transmission control unit 112 can set power having a different characteristic to be supplied to each of the coils corresponding to the electronic devices. Here, the wireless power transmitter 100 can transfer power by differently setting a power transfer scheme, efficiency, characteristic and the like for each electronic device. The power transmission for one or more electronic devices will be described later with reference to FIG. 8. The power conversion unit 111 may further include an impedance matching unit for controlling an impedance to form a resonant circuit with the coils connected thereto.

Figure 6:
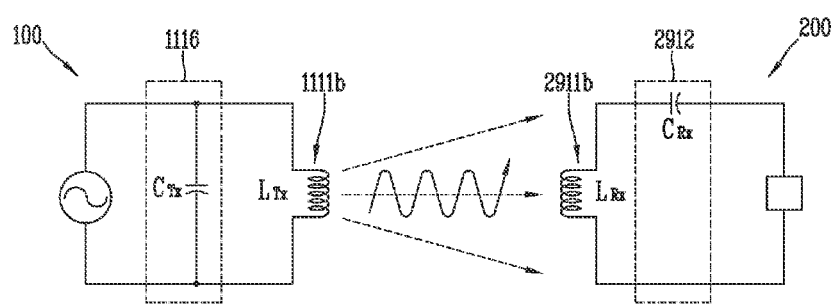
FIG. 6 is a view illustrating a concept in which power is transferred to an electronic device from a wireless power transmitter in a wireless manner according to a resonance coupling method.

Hereinafter, a method for allowing a wireless power transmitter to transfer power according to a resonance coupling method will be disclosed with reference to FIGS. 6 to 8. In particular, FIG. 6 is a view illustrating a concept in which power is transferred to an electronic device from a wireless power transmitter in a wireless manner according to a resonance coupling method.

First, resonance will be described in brief as follows. Resonance refers to a phenomenon in which an amplitude of vibration is remarkably increased when periodically receiving an external force having the same frequency as the natural frequency of a vibration system. Resonance is a phenomenon occurring in all types of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. When a resonance phenomenon occurs in the electronic device 200 by the formed magnetic field, power is generated by the resonance phenomenon in the electronic device 200.

Describing a principle of the resonance coupling, in general, a method for transferring power by generating an electromagnetic wave exhibits low power transmission efficiency. However, if the plurality of vibrating bodies resonate with each other in an electromagnetic manner as aforementioned, extremely high power transmission efficiency may be exhibited due to non affection by adjacent objects except for the vibrating bodies. An energy tunnel can be generated between the plurality of vibrating bodies which resonate with each other in the electromagnetic manner. This is referred to as energy coupling or energy tail.

The resonance coupling disclosed herein can use an electromagnetic wave having a low frequency. When power is transferred using the electromagnetic wave having the low frequency, only a magnetic field affects an area located within a single wavelength of the electromagnetic wave. This is referred to as magnetic coupling or magnetic resonance. The magnetic resonance can be generated when the wireless power transmitter 100 and the electronic device 200 are located within the single wavelength of the electromagnetic wave having the low frequency.

Also, as the energy tail is generated in response to the resonance phenomenon, the form of power transmission exhibits a non-radiative property. Consequently, upon transferring power using such electromagnetic wave, a radiative problem which occurs frequently can be solved.

The resonance coupling method is a method for transferring power using the electromagnetic wave with the low frequency, as aforementioned. Thus, the transmitting coil 1111b of the wireless power transmitter 100 can form a magnetic field or electromagnetic wave for transferring power in principle. The resonance coupling method will now be described from the perspective of a magnetic resonance, namely, a power transmission by a magnetic field.

The resonant frequency may be determined by the following formula in Equation 1.

$$f = \frac{1}{2\pi\sqrt{LC}} \qquad \text{(Equation 1)}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit can be connected thereto to determine the resonant frequency.

Referring to FIG. 6, when power is transmitted in a wireless manner according to the resonance coupling method, the power conversion unit 111 of the wireless power transmitter 100 includes a transmitting (Tx) coil 1111b in which a magnetic field is formed and a resonant circuit (or RESONANT GENERATION CIRCUIT) 1116 connected to the transmitting coil 1111b to determine a specific vibration frequency. The resonant circuit 1116 can be implemented by using a capacitive circuit (capacitors), and the specific vibration frequency can be determined based on an inductance of the transmitting coil 1111b and a capacitance of the resonant circuit 1116.

The configuration of a circuit element of the resonant circuit 1116 can be implemented in various forms such that the power conversion unit 111 forms a magnetic field, and is not limited to a form of being connected in parallel to the transmitting coil 1111b as illustrated in FIG. 6.

Furthermore, the power receiving unit 291 of the electronic device 200 includes a resonant circuit 2912 and a receiving (Rx) coil 2911b to generate a resonance phenomenon by a magnetic field formed in the wireless power transmitter 100. In other words, the resonant circuit 2912 can be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 includes $L_{TX}$, $C_{TX}$, and be acquired by using the Equation 1. Here, the electronic device 200 generates resonance when a result of substituting the $L_{RX}$ and $C_{RX}$ of the electronic device 200 to the Equation 1 is same as the specific vibration frequency.

According to a contactless power transfer method by resonance coupling, when the wireless power transmitter 100 and electronic device 200 resonate at the same frequency, respectively, an electromagnetic wave is propagated through a short-range magnetic field. Further, no energy transfer between the devices occurs if they have different frequencies.

As a result, an efficiency of contactless power transfer by the resonance coupling method is greatly affected by a frequency characteristic, whereas the effect of an alignment and distance between the wireless power transmitter 100 and the electronic device 200 including each coil is relatively smaller than the inductive coupling method.

Figure 7A:
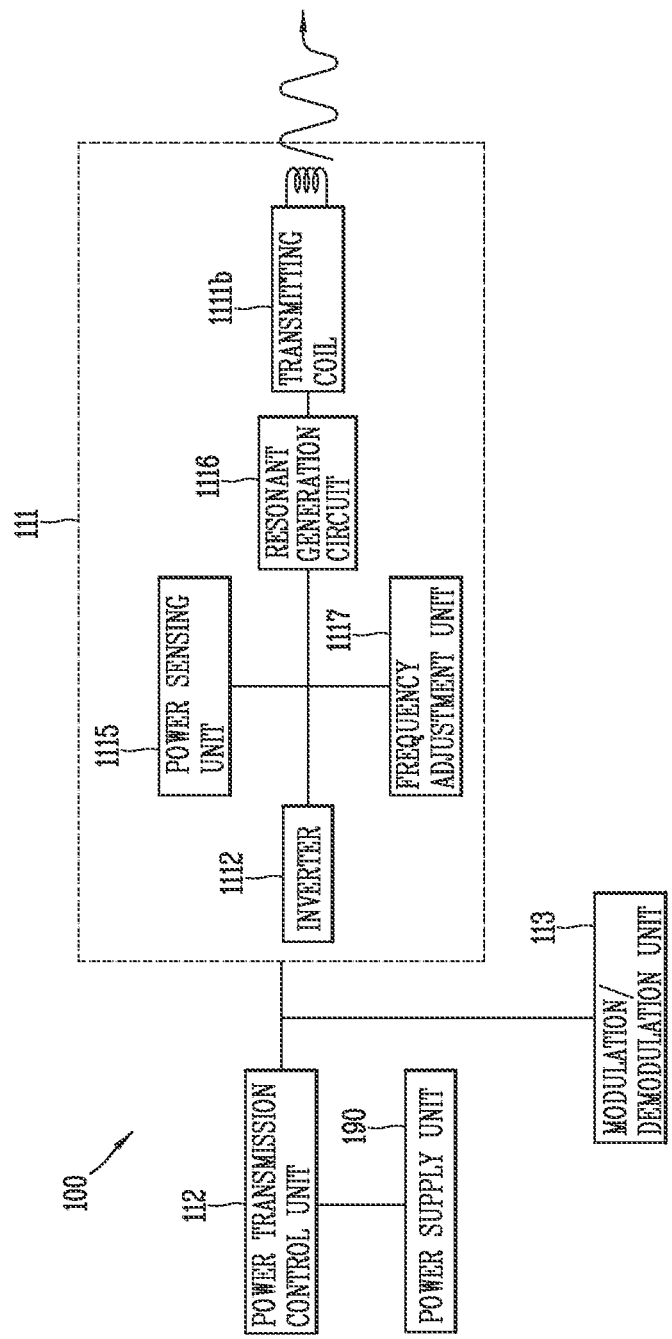
FIGS. 7A and 7B are block diagrams illustrating part of a wireless power transmitter and an electronic device in a resonance method that can be employed in the embodiments disclosed herein.
Figure 7B:
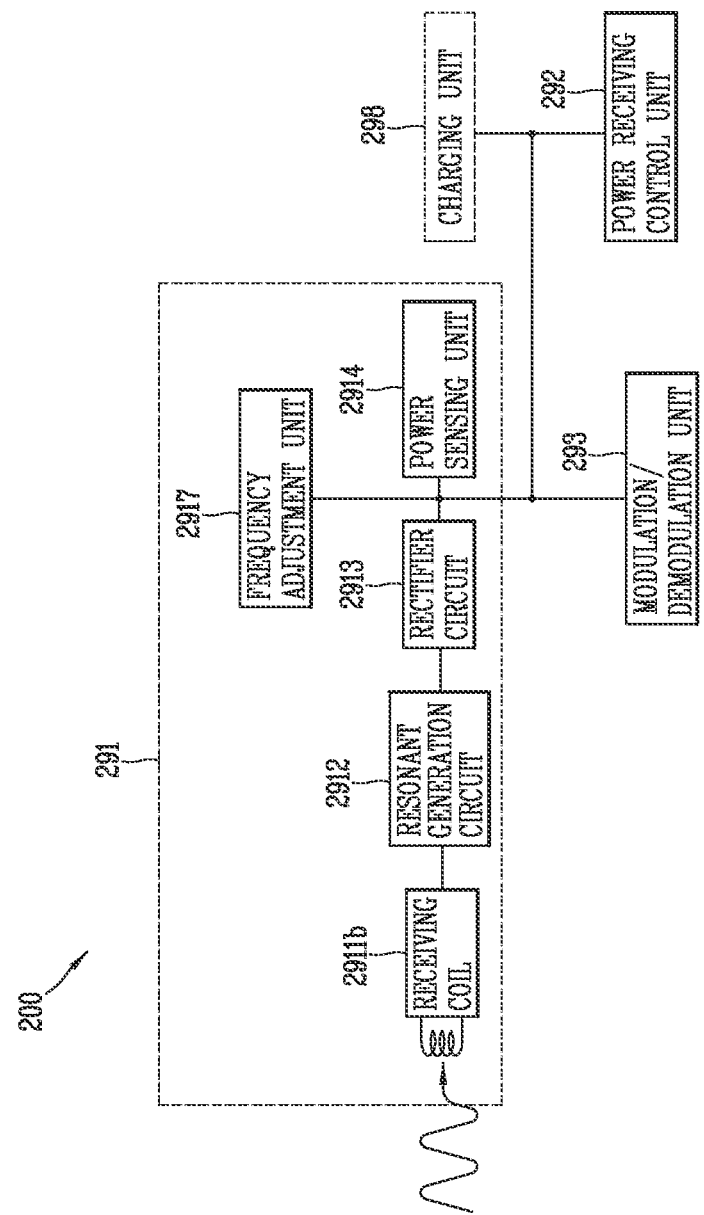

Next, the configuration of a wireless power transmitter and an electronic device in the resonance coupling method applicable to the embodiments disclosed herein will be described in detail. In particular, FIGS. 7A and 7B are block diagrams illustrating part of the wireless power transmitter 100 and the electronic device 200 in a resonance method that can be used in the embodiments disclosed herein.

A configuration of the power transmission unit 110 included in the wireless power transmitter 100 will be described with reference to FIG. 7A. The power conversion unit 111 of the wireless power transmitter 100 includes a transmitting (Tx) coil 1111b, an inverter 1112, and a resonant circuit 1116. The inverter 1112 is connected to the transmitting coil 1111b and the resonant circuit 1116.

Further, the transmitting coil 1111b can be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and a vibration frequency can be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116. In addition, the power conversion unit 111 may further include a frequency adjustment unit 1117 for changing a resonant frequency of the power conversion unit 111.

The resonant frequency of the power conversion unit 111 is determined based on an inductance and/or capacitance within a circuit constituting the power conversion unit 111 by Equation 1, and thus the power transmission control unit 112 can determine the resonant frequency of the power conversion unit 111 by controlling the frequency adjustment unit 1117 to change the inductance and/or capacitance.

The frequency adjustment unit 1117, for example, may include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance. Further, the power conversion unit 111 may further include a power sensing unit 1115. The operation of the power sensing unit 1115 is the same as the foregoing description.

Referring to FIG. 7B, a configuration of the power supply unit 290 included in the electronic device 200 will be described. The power supply unit 290, as described above, may include a receiving (Rx) coil 2911b and a resonant circuit 2912. In addition, the power receiving unit 291 of the power supply unit 290 may further include a rectifier generation circuit 2913 for converting an AC current generated by resonance phenomenon into DC. The rectifier generation circuit 2913 may be configured similarly to the foregoing description.

The power receiving unit 291 may further include a frequency adjustment unit 2917 for changing a resonant frequency of the power receiving unit 291. The resonant frequency of the power receiving unit 291 is determined based on an inductance and/or capacitance within a circuit constituting the power receiving unit 291 by Equation 1, and thus the power receiving control unit 112 can determine the resonant frequency of the power receiving unit 291 by controlling the frequency adjustment unit 2917 to change the inductance and/or capacitance.

The frequency adjustment unit 2917, for example, may include a motor for adjusting a distance between capacitors included in the resonant circuit 1116 to change a capacitance, or include a motor for adjusting a number of turns or a diameter of the transmitting coil 1111b to change an inductance, or include active elements for determining the capacitance and/or inductance The power receiving unit 291 may further include a power sensing unit 2914 for monitoring a voltage and/or current of the rectified power. The power sensing unit 2914 may be configured similarly to the foregoing description.

Next, FIG. 8 is a block diagram illustrating a wireless power transmitter including one or more transmission coils receiving power according to a resonance coupling method that can be employed in the embodiments disclosed herein. Referring to FIG. 8, the power conversion unit 111 of the wireless power transmitter 100 according to the embodiments disclosed herein may include one or more transmitting coils 1111b-1 to 1111b-n and resonant circuits 1116-1 to 1116-n connected to each transmitting coils.

Furthermore, the power conversion unit 111 may further include a multiplexer 1113 for establishing and releasing the connection of some of the one or more transmitting coils 1111b-1 to 1111b-n. The transmitting coils 1111b-1 to 1111b-n may be configured to have the same vibration frequency, or some of them may be configured to have different vibration frequencies. It is determined by an inductance and/or capacitance of the resonant circuits 1116-1 to 1116-n connected to the transmitting coils 1111b-1 to 1111b-n, respectively.

Further, when one or more electronic devices 200 are disposed in an active area or a detection area of the wireless power transmitter 100 including the transmitting coils 1111b-1 to 1111b-n, the power transmission control unit 112 can control the multiplexer 1113 to allow the electronic devices to be placed in different resonance coupling relations. Accordingly, the wireless power transmitter 100 can wirelessly transfer power to the one or more electronic devices by generating the wireless power signal using different coils.

In addition, the power transmission control unit 112 can set power with a different characteristic to be supplied to each of the coils corresponding to the electronic devices. Here, the wireless power transmitter 100 can transfer power by differently setting a power transmission scheme, a resonant frequency, efficiency, a characteristic and the like for each electronic device. The power transmission for one or more electronic devices will be described later with reference to FIG. 28.

For this purpose, the frequency adjustment unit 1117 may be configured to change an inductance and/or capacitance of the resonant circuits 1116-1 to 1116-n connected to the one or more transmitting coils 1111b-1 to 1111b-n, respectively. Hereinafter, an example of the wireless power transmitter implemented in the form of a wireless charger will be described.

Figure 9:
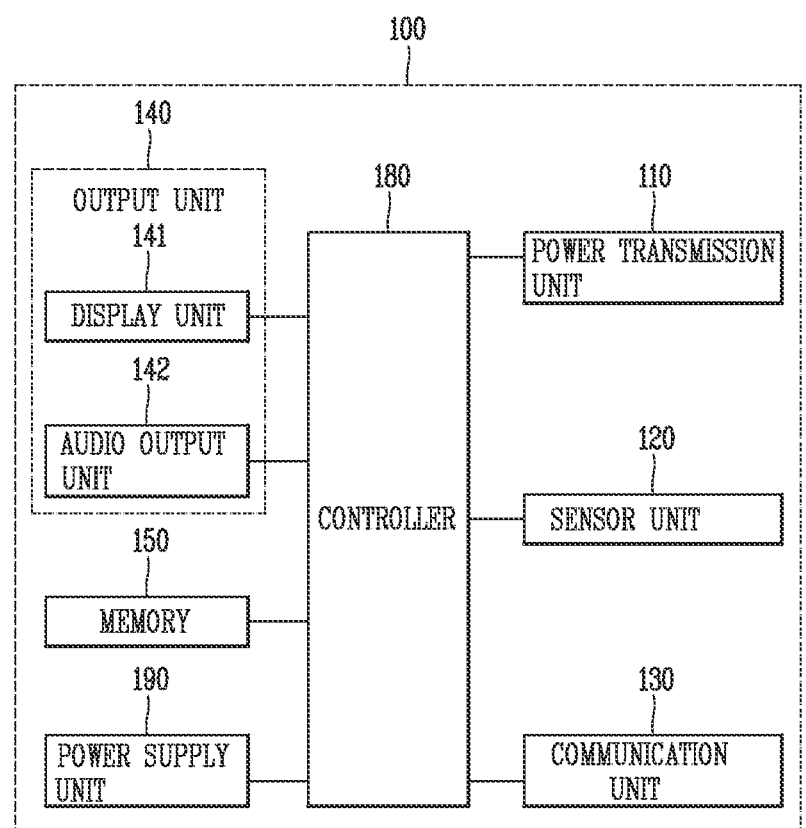
FIG. 9 is a block diagram illustrating a wireless power transmitter further including an additional element in addition to the configuration illustrated in FIG. 2A.

FIG. 9 is a block diagram illustrating a wireless power transmitter further including an additional element in addition to the configuration illustrated in FIG. 2A. Referring to FIG. 9, the wireless power transmitter 100 may further include a sensor unit 120, a communication unit 130, an output unit 140, a memory 150, and a control unit (or Controller) 180 in addition to the power transmission unit 110 and power supply unit 190 for supporting at least one of the foregoing inductive coupling method and resonance coupling method.

The controller 180 controls the power transmission unit 110, the sensor unit 120, the communication unit 130, the output unit 140, the memory 150, and the power supply unit 190. The receiving unit 291 180 may be implemented by a module separated from the power transmission control unit 112 in the power transmission unit 110 described with reference to FIG. 2 or may be implemented by a single module.

The sensor unit 120 may include a sensor for detecting the location of the electronic device 200. The location information detected by the sensor unit 120 may be used for allowing the power transmission unit 110 to transfer power in an efficient manner. For instance, for wireless power transfer according to the inductive coupling method, the sensor unit 120 can be operated as a detection unit, and the location information detected by the sensor unit 120 can be used to move or rotate the transmitting coil 1111a in the power transmission unit 110.

Furthermore, for example, the wireless power transmitter 100 including one or more transmitting coils can determine coils that can be placed in an inductive coupling relation or resonance coupling relation to the receiving coil of the electronic device 200 among the one or more transmitting coils based on the location information of the electronic device 200.

Further, the sensor unit 120 can be configured to monitor whether or not the electronic device 200 approaches a chargeable region. The approach or non-approach detection function of the sensor unit 120 may be performed separately from the function of allowing the power transmission control unit 112 in the power transmission unit 110 to detect the approach or non-approach of the electronic device 200.

The communication unit 130 performs wired or wireless data communication with the electronic device 200. The communication unit 130 may include an electronic component for at least any one of Bluetooth™, ZigBee, Ultra Wide Band (UWB), Wireless USB, Near Field Communication (NFC), and Wireless LAN.

The output unit 140 may include at least one of a display unit 141 and an audio output unit (or SOUND OUTPUT UNIT) 142. The display unit 141 may include at least one of a liquid crystal display (LCD), a thin film transistor-liquid crystal display (TFT-LCD), an organic light-emitting diode (OLED), a flexible display, and a three-dimensional (3D) display. The display unit 141 may display a charging state under the control of the controller 180.

The memory 150 may include at least one storage medium of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The wireless power transmitter 100 may operate in association with a web storage performing the storage function of the memory 150 on the Internet.

A program or commands performing the foregoing functions of the wireless power transmitter 100 may be stored in the memory 150. The control unit (or Controller) 180 may perform the program or commands stored in the memory 150 to transmit power in a wireless manner. A memory controller may be used to allow other constituent elements (e.g., controller 180) included in the wireless power transmitter 100 to access the memory 150.

However, the configuration of a wireless power transmitter according to the embodiment disclosed herein may be applicable to an apparatus, such as a docking station, a terminal cradle device, and an electronic device, and the like, excluding a case where it is applicable to only a wireless charger.

Figure 10:
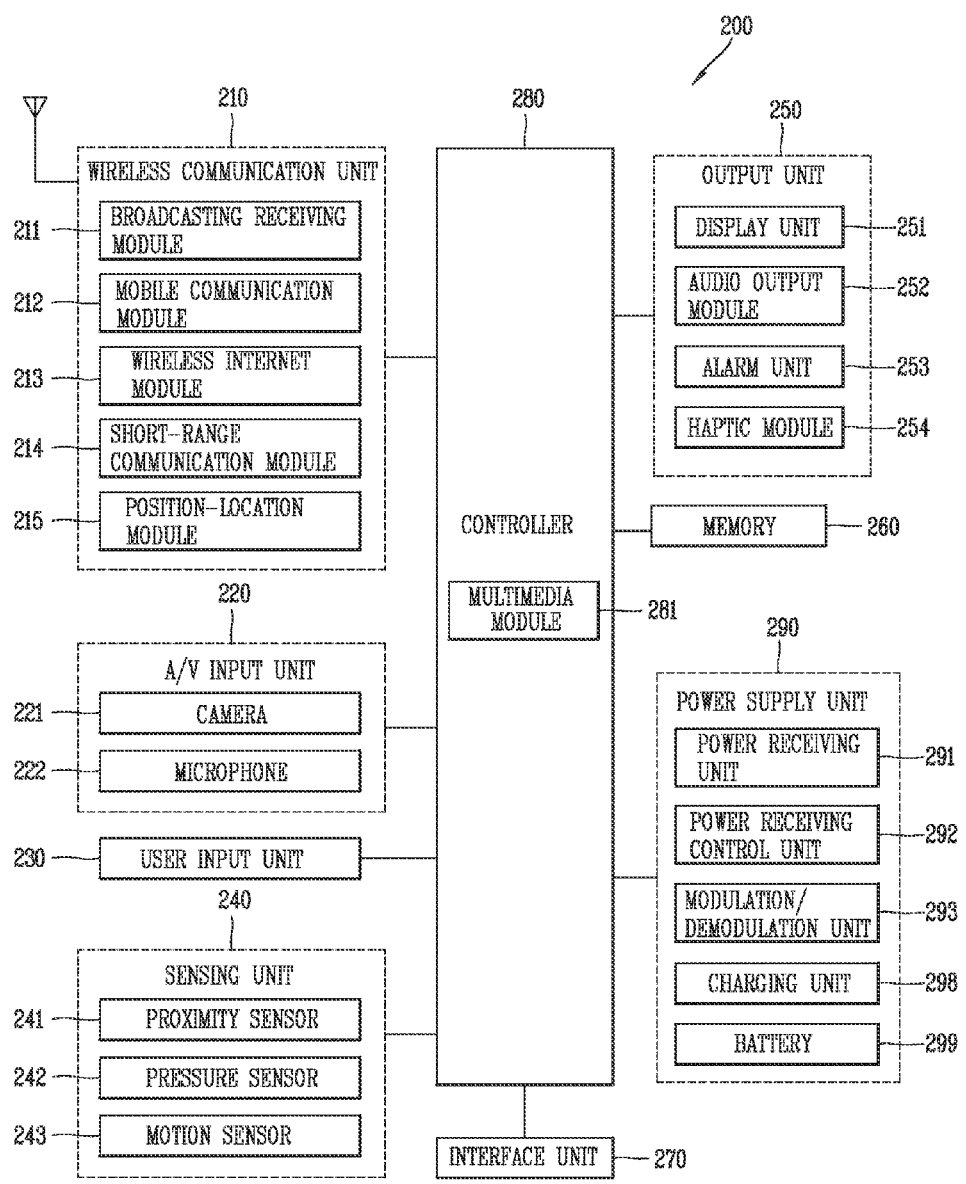
FIG. 10 is view illustrating a configuration when an electronic device according to the embodiments disclosed herein is implemented in the form of a mobile terminal.

Next, FIG. 10 is view illustrating a configuration when an electronic device 200 according to the embodiments disclosed herein is implemented in the form of a mobile terminal. The mobile communication terminal 200 may include a power supply unit 290 illustrated in FIG. 2, 4, or 7.

Furthermore, the terminal 200 may further include a wireless communication unit 210, an Audio/Video (A/V) input unit 220, a user input unit 230, a sensing unit 240, an output unit 250, a memory 260, an interface unit 270, and a controller 280. FIG. 10 illustrates the terminal 100 having various components, but implementing all of the illustrated components is not a requirement. Greater or fewer components may alternatively be implemented.

Hereinafter, each component is described in sequence.

The wireless communication unit 210 may typically include one or more modules which permit wireless communications between the terminal 200 and a wireless communication system or between the terminal 200 and a network within which the terminal 200 is located. For example, the wireless communication unit 210 may include a broadcast receiving module 211, a mobile communication module 212, a wireless internet module 213, a short-range communication module 214, a position location module 215 and the like.

The broadcast receiving module 211 receives a broadcast signal and/or broadcast associated information from an external broadcast managing entity via a broadcast channel. The broadcast channel may include a satellite channel and a terrestrial channel. The broadcast center may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may denote information associated with a broadcast channel, a broadcast program, a broadcast service provider, and the like. The broadcast associated information may be provided via a mobile communication network. In this instance, it may be received by the mobile communication module 212.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 211 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 211 may be configured to be suitable for every broadcast system transmitting broadcast signals as well as the digital broadcasting systems. Broadcast signals and/or broadcast associated information received via the broadcast receiving module 211 may be stored in a suitable device, such as a memory 260.

The mobile communication module 212 transmits/receives wireless signals to/from at least any one of a base station, an external portable terminal, and a server on a mobile communication network. The wireless signal may include audio call signal, video (telephony) call signal, or various formats of data according to transmission/reception of text/multimedia messages.

The wireless internet module 213 supports wireless Internet access for the mobile terminal 200. This module may be internally or externally coupled to the terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 214 denotes a module for short-range communications. Suitable technologies for implementing this module may include Bluetooth, Radio Frequency IDentification (RFID), Infrared Data Association (IrDA), Ultra-WideBand (UWB), ZigBee, and the like. Further, Universal Serial Bus (USB), IEEE 1394, Thunderbolt of Intel technology, and the like, may be used for wired short-range communication.

The wireless internet module 213 or the short-range communication module 214 may establish data communication connection to the wireless power transmitter 100. Through the established data communication, when there is an audio signal to be output while transferring power in a wireless manner, the wireless internet module 213 or the short-range communication module 214 can transmit the audio signal to the wireless power transmitter 100 through the short-range communication module.

Furthermore, through the established data communication, when there is information to be displayed, the wireless internet module 213 or the short-range communication module 214 can transmit the information to the wireless power transmitter 100. Otherwise, the wireless internet module 213 or the short-range communication module 214 can transmit an audio signal received through a microphone integrated in the wireless power transmitter 100. Furthermore, the wireless internet module 213 or the short-range communication module 214 can transmit the identification information (e.g., phone number or device name when a portable phone) of the mobile terminal 200 to the wireless power transmitter 100 through the established data communication.

The position location module 215 is a module for acquiring a position of the terminal. An example of the position location module 215 may include a Global Position System (GPS) module. Referring to FIG. 10, the A/V input unit 220 is configured to provide audio or video signal input to the portable terminal. The A/V input unit 220 may include a camera 221 and a microphone 222. The camera 221 processes image frames of still or moving images obtained by an image sensor in a video call mode or a capture more. The processed image frames may be displayed on the display unit 251.

The image frames processed by the camera 221 may be stored in the memory 260 or transmitted to the exterior via the wireless communication unit 210. Two or more cameras 221 may be provided therein according to the use environment.

The microphone 222 can receive an external audio signal by a microphone in a phone call mode, a recording mode, a voice recognition mode, or the like to process it into electrical audio data. The processed audio data is converted and output into a format transmittable to a mobile communication base station via the mobile communication module 212 for the phone call mode. The microphone 222 may include various noise removal algorithms to remove noises generated while receiving the external audio signal.

The user input unit 230 can generate input data to allow the user to control the operation of the terminal. The user input unit 230 may include a keypad, a dome switch, a touchpad (e.g., static pressure/capacitance), a jog wheel, a jog switch and the like.

The sensing unit 240 may include a proximity sensor 241, a pressure sensor 242, a motion sensor 243, and the like. The proximity sensor 241 detects an object approaching the mobile terminal 200, or the presence or absence of an object existing adjacent to the mobile terminal 200, and the like without any mechanical contact. The proximity sensor 241 may detect a proximity object using a change of the AC magnetic field or static magnetic field, a change rate of the electrostatic capacity, or the like. Two or more proximity sensors 241 may be provided according to the aspect of configuration.

The pressure sensor 242 may detect whether or not a pressure is applied to the mobile terminal 200, a size of the pressure, and the like. The pressure sensor 242 may be provided at a portion where the detection of a pressure is required in the mobile terminal 200 according to the use environment. When the pressure sensor 242 is provided in the display unit 251, it may be possible to identify a touch input through the display unit 251 and a pressure touch input by which a pressure larger than the touch input is applied according to a signal output from the pressure sensor 242. Furthermore, it may be possible to know a size (strength) of the pressure applied to the display unit 251 during the input of a pressure touch.

The motion sensor 243 detects the location or movement of the mobile terminal 200 using an acceleration sensor, a gyro sensor, and the like. The acceleration sensor used in the motion sensor 243 is an element for converting an acceleration change in any one direction into an electrical signal. Two or three axes are typically integrated into a package to constitute an acceleration sensor, and only one Z-axis may be required according to the use environment.

Accordingly, when an acceleration sensor in the direction of X-axis or Y-axis should be used instead of the direction of Z-axis due to any reason, the acceleration sensor may be erected and mounted on a main substrate using a separate piece substrate. Furthermore, the gyro sensor is a sensor for measuring an angular speed of the mobile terminal 200 in a rotational movement to detect a rotated angle with respect to each reference direction. For instance, the gyro sensor may detect each rotational angle, i.e., azimuth, pitch and roll, with reference to three directional axes.

The output unit 250 is provided to output visual, auditory, or tactile information. The output unit 250 may include a display unit 251, an audio output module 252, an alarm unit 253, a haptic module 254, and the like. The display unit 251 may display (output) information processed in the terminal 200. For example, when the terminal is in a phone call mode, the display unit 251 will provide a User Interface (UI) or Graphic User Interface (GUI) associated with the call. When the terminal is in a video call mode or a capture mode, the display unit 251 may display images captured and/or received, UI, or GUI.

The display unit 251 may include at least one of a liquid crystal display (LCD), a thin film transistor-liquid crystal display (TFT-LCD), an organic light-emitting diode (OLED), a flexible display, a three-dimensional (3D) display, and the like. Some of those displays may be configured as a transparent type or an light transmission type through which the outside is visible, which is referred to as a transparent display. A representative example of the transparent display may include a Transparent OLED (TOLED), or the like. The rear surface of the display unit 151 may also be implemented to be optically transparent. Under this configuration, the user can view an object positioned at a rear side of the terminal body through a region occupied by the display unit 251 of the terminal body.

The display unit 251 may be implemented in two or more in number according to a configured aspect of the terminal 200. For instance, a plurality of the display units 251 may be arranged on one surface to be spaced apart from or integrated with each other, or may be arranged on different surfaces. Here, if the display unit 251 and a touch sensitive sensor (referred to as a touch sensor) have a layered structure therebetween, the display unit 251 may be used as an input device rather than an output device. The touch sensor may be implemented as a touch film, a touch sheet, a touch pad, and the like.

The touch sensor may be configured to convert changes of a pressure applied to a specific part of the display unit 251, or a capacitance occurring from a specific part of the display unit 251, into electric input signals. Also, the touch sensor may be configured to sense not only a touched position and a touched area, but also touch pressure.

When touch inputs are sensed by the touch sensors, corresponding signals are sent to a touch controller. The touch controller processes the received signals, and then transmits corresponding data to the controller 280. Accordingly, the controller 280 may sense which region of the display unit 151 has been touched.

The proximity sensor 241 may be arranged at an inner region of the terminal covered by the touch screen, or near the touch screen. The proximity sensor refers to a sensor to sense the presence or absence of an object approaching a surface to be sensed, or an object disposed near a surface to be sensed, using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

Hereinafter, for the sake of brief explanation, a status that the pointer is positioned to be proximate onto the touch screen without contact will be referred to as a "proximity touch", whereas a status that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 241 senses proximity touch, and proximity touch patterns (e.g., distance, direction, speed, time, position, moving status, etc.). Information relating to the sensed proximity touch and the sensed proximity touch patterns may be output onto the touch screen.

The audio output module 252 may output audio data received from the wireless communication unit 210 or stored in the memory 260, in a call-receiving mode, a call-placing mode, a recording mode, a voice recognition mode, a broadcast reception mode, and so on. The audio output module 252 may output audio signals relating to functions performed in the terminal 200, e.g., sound alarming a call received or a message received, and so on. The audio output module 252 may include a receiver, a speaker, a buzzer, and so on.

The alarm unit 253 outputs signals notifying the occurrence of an event from the terminal 200. The event occurring from the terminal 100 may include call received, message received, key signal input, touch input, and so on. The alarm unit 253 may output not only video or audio signals, but also other types of signals such as signals notifying occurrence of events in a vibration manner. Since the video or audio signals can be output through the display unit 251 or the audio output unit 252, the display unit 251 and the audio output module 252 may be categorized into part of the alarm unit 253.

The haptic module 254 generates various tactile effects which a user can feel. A representative example of the tactile effects generated by the haptic module 254 includes vibration. Vibration generated by the haptic module 254 may have a controllable intensity, a controllable pattern, and so on. For instance, different vibration may be output in a synthesized manner or in a sequential manner.

The haptic module 254 can generate various tactile effects, including not only vibration, but also arrangement of pins vertically moving with respect to a skin being contacted, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 254 may be configured to transmit tactile effects through the user's direct contact, or the user's muscular sense using a finger or a hand. The haptic module 254 may be implemented in two or more in number according to the configuration of the terminal 200.

The memory 260 may store a program for the processing and control of the controller 280. Alternatively, the memory 260 may temporarily store input/output data (e.g., phonebook data, messages, still images, video and the like). Also, the memory 260 may store data related to various patterns of vibrations and audio output upon the touch input on the touch screen.

In some embodiments, software components including an operating system, a module performing a wireless communication unit 210 function, a module operating together with the user input unit 230, a module operating together with the A/V input unit 220, a module operating together with the output unit 250 may be stored in the memory 260. The operating system (e.g., LINUX, UNIX, OS X, WINDOWS, Chrome, Symbian, iOS, Android, VxWorks, or other embedded operating systems) may include various software components and/or drivers to control system tasks such as memory management, power management, and the like.

In addition, the memory 260 may store a setup program associated with contactless power transfer or wireless charging. The setup program may be implemented by the controller 280. Furthermore, the memory 260 may store an application associated with contactless power transfer (or wireless charging) downloaded from an application providing server (for example, an app store). The wireless charging related application is a program for controlling wireless charging transmission, and thus the electronic device 200 can receive power from the wireless power transmitter 100 in a wireless manner or establish connection for data communication with the wireless power transmitter 100 through the relevant program.

The memory 260 may be implemented using any type of suitable storage medium including a flash memory type, a hard disk type, a multimedia card micro type, a memory card type (e.g., SD or xD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Also, the terminal 200 may be operated in association with a web storage performing the storage function of the memory 160 on the Internet.

The interface unit 270 may generally be implemented to interface the portable terminal with all external devices. The interface unit 270 may allow a data reception from an external device, a power delivery to each component in the terminal 200, or a data transmission from the terminal 200 to an external device. The interface unit 270 may include, for example, wired/wireless headset ports, external charger ports, wired/wireless data ports, memory card ports, ports for coupling devices having an identification module, audio input/output (I/O) ports, video input/output (I/O) ports, earphone ports, and the like.

The identification module may be configured as a chip for storing various information required to authenticate an authority to use the terminal 200, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the terminal 200 via a port.

Also, the interface unit may serve as a path for power to be supplied from an external cradle to the terminal 200 when the terminal 100 is connected to the external cradle or as a path for transferring various command signals input from the cradle by a user to the terminal 200. Such various command signals or power input from the cradle may operate as signals for recognizing that the terminal 200 has accurately been mounted to the cradle.

The controller 280 typically controls the overall operations of the terminal 200. For example, the controller 280 performs the control and processing associated with telephony calls, data communications, video calls, and the like. The controller 280 may include a multimedia module 281 for multimedia playback. The multimedia module 281 may be implemented within the controller 280, or implemented separately from the controller 280. Also, the controller 280 may be implemented into a separate module from the power receiving control unit 292 within the power supply unit 290 or a single module.

The controller 280 can perform a pattern recognition processing so as to recognize a writing input or image drawing input performed on the touch screen as a text or image. The controller 280 performs wired or wireless charging according to the user input or internal input. Here, the internal input represents a signal for notifying that an induced current generated from a secondary coil within the terminal has been detected.

When the aforementioned wireless charging is performed, an operation of allowing the controller 280 to control each constituent element will be described in detail below with reference to the operation phase in FIG. 14. As described above, the power receiving control unit 292 within the power supply unit 290 may be implemented to be included in the controller 280, and in the present invention, it should be understood that the controller 280 performs the operation by the power receiving control unit 292.

The power supply unit 290 receives internal and external power under the control of the controller 280 to supply power required for the operation of each constituent element. The power supply unit 290 is provided with a battery 299 for supplying power to each constituent element of the terminal 200, and the battery 299 may include a charging unit 298 for performing wired or wireless charging. The power receiving unit 291, power receiving control unit 292 and modulation/demodulation unit were described in FIG. 2B and will described in more detail below.

The present invention discloses a mobile terminal as an example of the apparatus for receiving power in a wireless manner, but the configuration according to the embodiment disclosed herein may be applicable to a stationary terminal, such as a digital TV, a desktop computer, and the like.

Figure 11A:
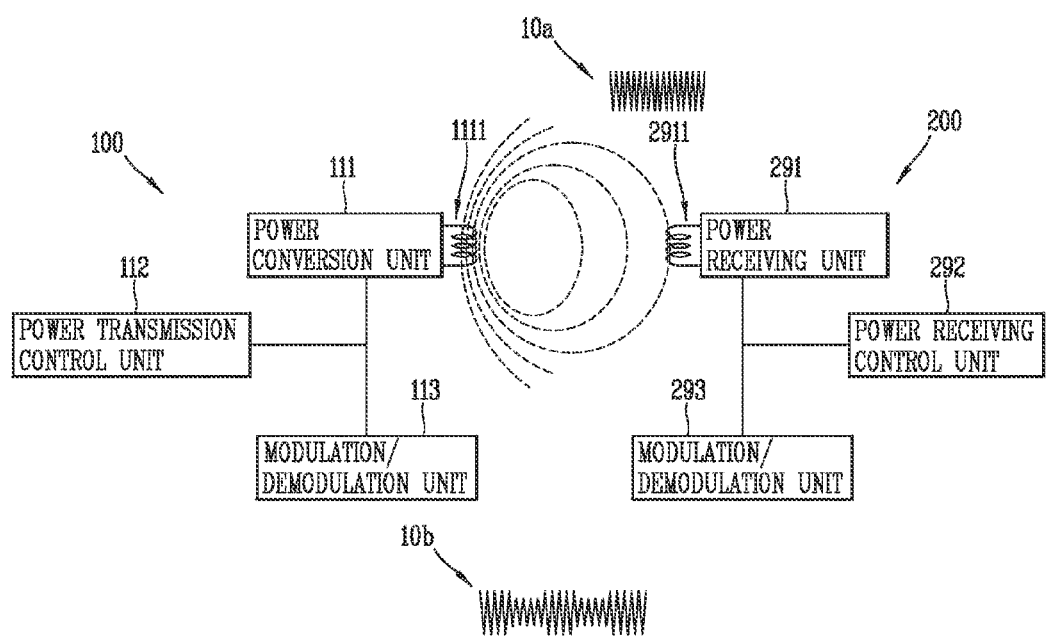
FIGS. 11A and 11B are views illustrating the concept of transmitting and receiving a packet between a wireless power transmitter and an electronic device through the modulation and demodulation of a wireless power signal in transferring power in a wireless manner disclosed herein.
Figure 11B:
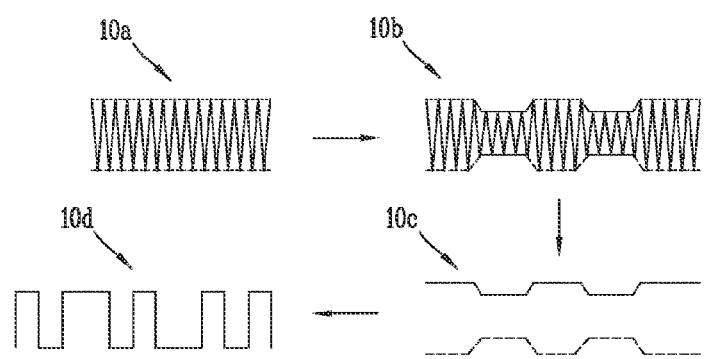

FIGS. 11A and 11B are views illustrating the concept of transmitting and receiving a packet between a wireless power transmitter and an electronic device through the modulation and demodulation of a wireless power signal in transferring power in a wireless manner disclosed herein.

Referring to FIG. 11A, the wireless power signal formed by the power conversion unit 111 forms a closed-loop within a magnetic field or electromagnetic field, and therefore, when the electronic device 200 modulates the wireless power signal while receiving the wireless power signal, the wireless power transmitter 100 can detect the modulated wireless power signal. The power communications modulation/demodulation unit 113 can demodulate the detected wireless power signal, and decodes the packet from the modulated wireless power signal.

Further, a modulation method used for communication between the wireless power transmitter 100 and the electronic device 200 may be amplitude modulation. As described above, the amplitude modulation method may be a backscatter modulation method in which the modulation/demodulation unit 293 at the side of the electronic device 200 changes an amplitude of the wireless power signal 10a formed by the power conversion unit 111 and the modulation/demodulation unit 293 at the side of the wireless power transmitter 100 detects an amplitude of the modulated wireless power signal 10b.

Specifically, further referring to FIG. 11B, the power receiving control unit 292 at the side of the electronic device 200 modulates the wireless power signal 10a received through the power receiving unit 291 by changing a load impedance within the modulation/demodulation unit 293. Power receiving control unit 292 modulates the wireless power signal 10a to include a packet including a power control message to be transmitted to the wireless power transmitter 100.

Then, the power transmission control unit 112 at the side of the wireless power transmitter 100 demodulates the modulated wireless power signal 10b through an envelope detection process, and decodes the detected signal 10c into digital data 10d. The demodulation process detects a current or voltage flowing into the power conversion unit 111 to be classified into two states, a HI phase and a LO phase, and acquires a packet to be transmitted by the electronic device 200 based on digital data classified according to the states.

Hereinafter, a process of allowing the wireless power transmitter 100 to acquire a power control message to be transmitted by the electronic device 200 from the demodulated digital data will be described. In particular, FIGS. 12A and 12B are views illustrating a method of showing data bits and byte constituting a power control message provided by the wireless power transmitter 100.

Figure 12A:
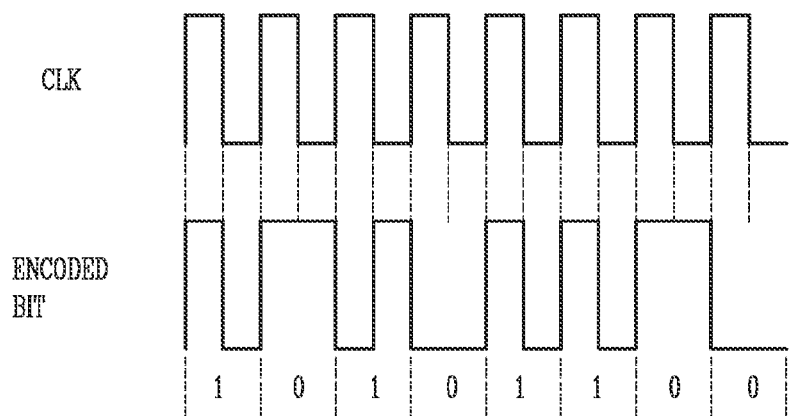
FIGS. 12A and 12B are views illustrating a method of showing data bits and byte constituting a power control message provided by the wireless power transmitter 100.
Figure 12B:
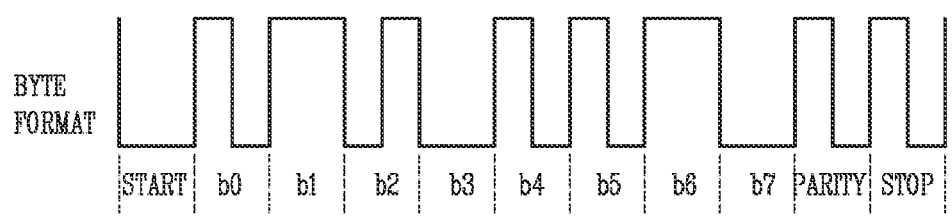

Referring to FIG. 12A, the power transmission control unit 112 detects an encoded bit using a clock signal (CLK) from an envelope detected signal. The detected encoded bit is encoded according to a bit encoding method used in the modulation process at the side of the electronic device 200. The bit encoding method may correspond to any one of non-return to zero (NRZ) and bi-phase encoding.

For instance, the detected bit may be a differential bi-phase (DBP) encoded bit. According to the DBP encoding, the power receiving control unit 292 at the side of the electronic device 200 is allowed to have two state transitions to encode data bit 1, and to have one state transition to encode data bit 0. In other words, data bit 1 may be encoded so a transition between the HI state and LO state is generated at a rising edge and falling edge of the clock signal, and data bit 0 may be encoded so a transition between the HI state and LO state is generated at a rising edge of the clock signal.

Further, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12B. In other words, the detected bit may include a start bit indicating the beginning of a byte and a stop bit indicating the end of a byte, and also include data bits (b0 to b7) between the start bit and the stop bit. A parity bit for checking an error of data can also be included. A stop bit may also be included. The data in a byte unit constitutes a packet including a power control message.

Figure 13:
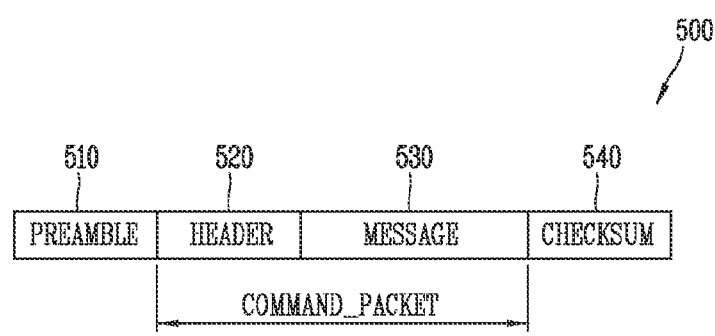
FIG. 13 is a view illustrating a packet including a power control message used in a contactless (wireless) power transfer method according to the embodiments disclosed herein.

Next, FIG. 13 is a view illustrating a packet including a power control message used in a contactless power transfer method according to the embodiments disclosed herein. The packet 500 may include a preamble 510, a header 520, a message 530, and a checksum 540.

The preamble 510 can be used to perform synchronization with data received by the wireless power transmitter 100 and detect the start bit of the header 520. The preamble 510 may be configured to repeat the same bit. For instance, the preamble 510 may be configured such that data bit 1 according to the DBP encoding is repeated eleven to twenty five times.

The header 520 may be used to indicate a type of the packet 500. A size of the message 530 and the kind thereof may be determined based on a value indicated by the header 520. The header 520 is a value having a predetermined size to be positioned subsequent to the preamble 510. For instance, the header 520 may be a byte in size.

The message 530 may be configured to include data determined based on the header 520. The message 530 has a predetermined size according to the kind thereof.

The checksum 540 may be used to detect an error that can be occurred in the header 520 and the message 530 while transmitting a power control message. The header 520 and the message 530 excluding the preamble 510 for synchronization and the checksum 540 for error checking may be referred to as command-packet.

Hereinafter, description will be given of operation phases of the wireless power transmitter 100 and the electronic device 200.

Figure 14:
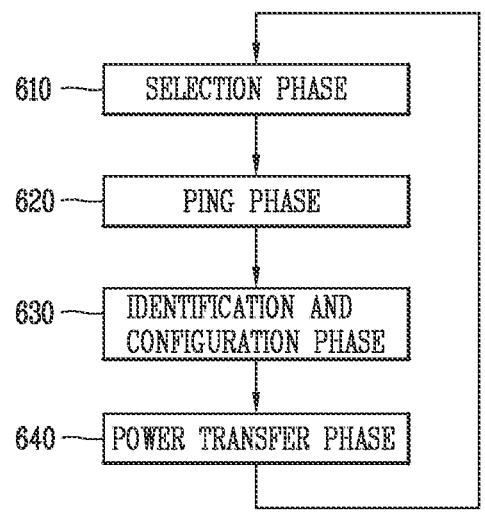
FIG. 14 is a view illustrating the operation phases of a wireless power transmitter and an electronic device according to the embodiments disclosed herein.

FIG. 14 illustrates the operation phases of the wireless power transmitter 100 and electronic device 200 according to the embodiments disclosed herein. Furthermore, FIGS. 15 through 20 illustrates the structure of packets including a power control message between the wireless power transmitter 100 and electronic device 200.

Referring to FIG. 14, the operation phases of the wireless power transmitter 100 and the electronic device 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection phase 610, and the wireless power transmitter 100 sends a detection signal to the detected object and the electronic device 200 sends a response to the detection signal in the ping phase 620.

Furthermore, the wireless power transmitter 100 identifies the electronic device 200 selected through the previous phases and acquires configuration information for power transmission in the identification and configuration phase 630. The wireless power transmitter 100 transmits power to the electronic device 200 while controlling power transmitted in response to a control message received from the electronic device 200 in the power transfer phase 640.

Hereinafter, each of the operation phases will be described in detail.

1) Selection Phase

The wireless power transmitter 100 in the selection phase 610 performs a detection process to select the electronic device 200 existing within a detection area. The detection area, as described above, refers to a region in which an object within the relevant area can affect on the characteristic of the power of the power conversion unit 111. Compared to the ping phase 620, the detection process for selecting the electronic device 200 in the selection phase 610 is a process of detecting a change of the power amount for forming a wireless power signal in the power conversion unit at the side of the wireless power transmitter 100 to check whether any object exists within a predetermined range, instead of the scheme of receiving a response from the electronic device 200 using a power control message. The detection process in the selection phase 610 may be referred to as an analog ping process in the aspect of detecting an object using a wireless power signal without using a packet in a digital format in the ping phase 620 which will be described later.

The wireless power transmitter 100 in the selection phase 610 can detect that an object comes in or out within the detection area. Furthermore, the wireless power transmitter 100 can distinguish the electronic device 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection phase 610 may be different from one another.

First, when power is transmitted according to the inductive coupling method, the wireless power transmitter 100 in the selection phase 610 can monitor an interface surface to detect the alignment and removal of objects. Furthermore, the wireless power transmitter 100 can detect the location of the electronic device 200 placed on an upper portion of the interface surface. As described above, the wireless power transmitter 100 formed to include one or more transmitting coils can perform the process of entering the ping phase 620 in the selection phase 610, and checking whether or not a response to the detection signal is transmitted from the object using each coil in the ping phase 620 or subsequently entering the identification phase 630 to check whether identification information is transmitted from the object. The wireless power transmitter 100 can determine a coil to be used for contactless power transfer based on the detected location of the electronic device 200 acquired through the foregoing process.

Furthermore, when power is transmitted according to the resonance coupling method, the wireless power transmitter 100 in the selection phase 610 can detect an object by detecting that any one of a frequency, a current and a voltage of the power conversion unit is changed due to an object located within the detection area.

In addition, the wireless power transmitter 100 in the selection phase 610 can detect an object by at least any one of the detection methods using the inductive coupling method and resonance coupling method. The wireless power transmitter 100 can perform an object detection process according to each power transmission method, and subsequently select a method of detecting the object from the coupling methods for contactless power transfer to advance to other phases 620, 630, 640.

Further, for the wireless power transmitter 100, a wireless power signal formed to detect an object in the selection phase 610 and a wireless power signal formed to perform digital detection, identification, configuration and power transmission in the subsequent phases 620, 630, 640 may have a different characteristic in the frequency, strength, and the like. It is because the selection phase 610 of the wireless power transmitter 100 corresponds to an idle phase for detecting an object, thereby allowing the wireless power transmitter 100 to reduce consumption power in the idle phase or generate a specialized signal for effectively detecting an object.

2) Ping Phase

The wireless power transmitter 100 in the ping phase 620 performs a process of detecting the electronic device 200 existing within the detection area through a power control message. Compared to the detection process of the electronic device 200 using a characteristic of the wireless power signal and the like in the selection phase 610, the detection process in the ping phase 620 may be referred to as a digital ping process.

The wireless power transmitter 100 in the ping phase 620 forms a wireless power signal to detect the electronic device 200, modulates the wireless power signal modulated by the electronic device 200, and acquires a power control message in a digital data format corresponding to a response to the detection signal from the modulated wireless power signal. The wireless power transmitter 100 can receive a power control message corresponding to the response to the detection signal to recognize the electronic device 200 which is a subject of power transmission.

The detection signal formed to allowing the wireless power transmitter 100 in the ping phase 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 can generate the detection signal generated by applying the power signal at a specific operating point for a predetermined period of time, and attempt to receive a power control message from the electronic device 200.

Figure 15:
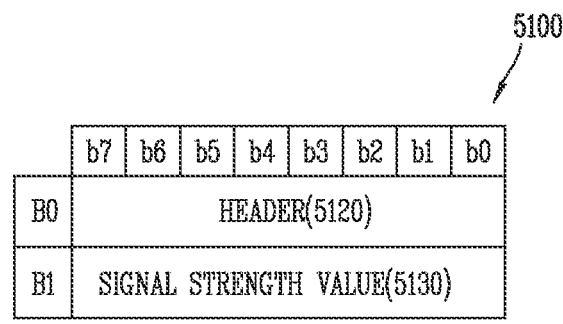
FIGS. 15 to 19 are views illustrating the structure of packets including a power control message between a wireless power transmitter and an electronic device.

Further, the power control message corresponding to a response to the detection signal may be a message indicating a strength of the wireless power signal received by the electronic device 200. For example, the electronic device 200 can transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating a strength of the power signal received by the electronic device 200. The strength of the power signal within the message 5130 may be a value indicating a degree of inductive coupling or resonance coupling for power transmission between the wireless power transmitter 100 and the electronic device 200.

The wireless power transmitter 100 can receive a response message to the detection signal to find the electronic device 200, and then extend the digital detection process to enter the identification and configuration phase 630. In other words, the wireless power transmitter 100 maintains the power signal at a specific operating point subsequent to finding the electronic device 200 to receive a power control message required in the identification and configuration phase 630.

However, if the wireless power transmitter 100 is not able to find the electronic device 200 to which power can be transferred, then the operation phase of the wireless power transmitter 100 will be returned to the selection phase 610.

3) Identification and Configuration Phase

The wireless power transmitter 100 in the identification and configuration phase 630 can receive identification information and/or configuration information transmitted by the electronic device 200, thereby controlling power transmission to be effectively performed.

Figure 16A:
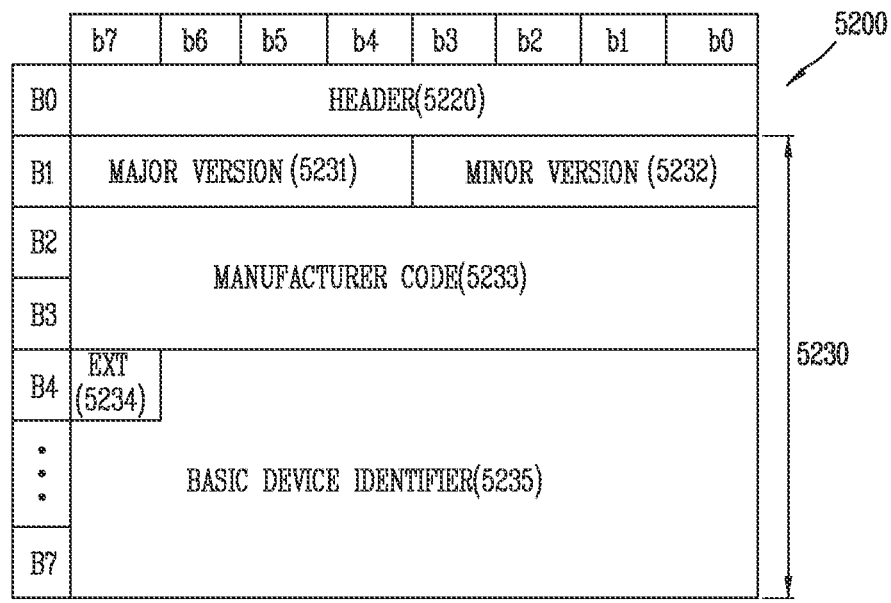

The electronic device 200 in the identification and configuration phase 630 can transmit a power control message including its own identification information. For this purpose, the electronic device 200, for instance, can transmit an identification packet 5200 including a message indicating the identification information of the electronic device 200 as illustrated in FIG. 16A. The packet 5200 may include a header 5220 for notifying a packet indicating identification information and a message 5230 including the identification information of the electronic device.

Figure 16B:
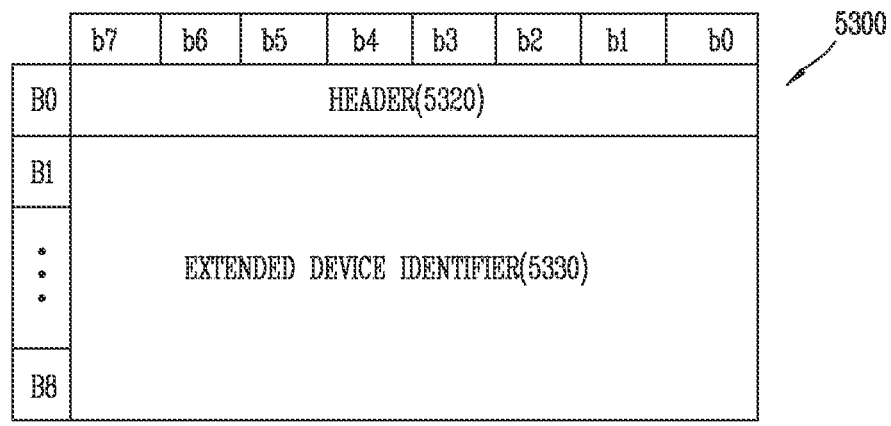

The message 5230 may include information (2531 and 5232) indicating a version of the contract for contactless power transfer, information 5233 for identifying a manufacturer of the electronic device 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 16B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the electronic device 200.

Figure 17:
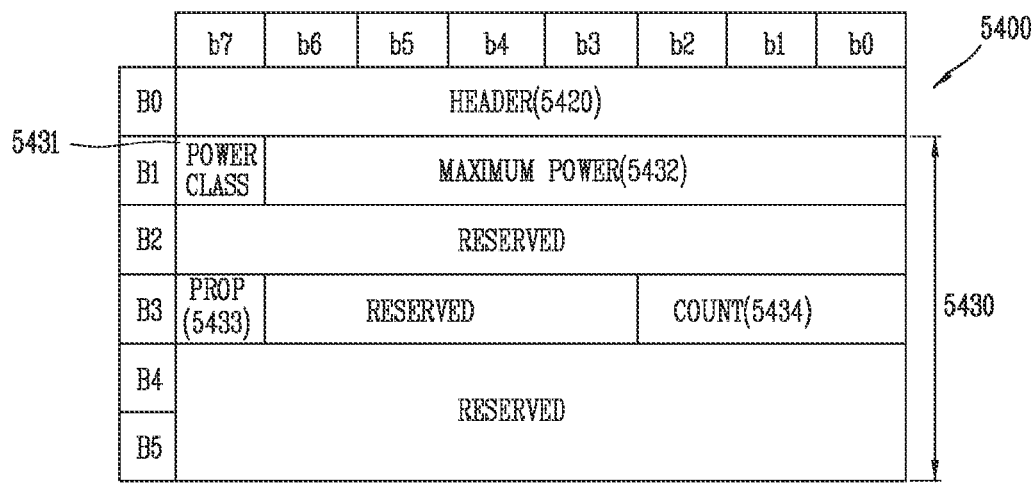

The electronic device 200 can transmit a power control message including information on expected maximum power in the identification and configuration phase 630. Thus, the electronic device 200, for instance, can transmit a configuration packet 5400 as illustrated in FIG. 17. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

Meanwhile, the electronic device 200 according to the embodiments can transmit a power control message, which includes required power information thereof and associated profile information, to the wireless power transmitter 100. In some embodiments, the required power information related to the electronic device 200 or the profile information may be transmitted by being included in the configuration packet 5400 as illustrated in FIG. 17. Alternatively, the required power information related to the electronic device 200 or the profile information may be transmitted by being included in a separate packet for configuration.

Further, the wireless power transmitter 100 can generate a power transfer contract which is used for power charging with the electronic device 200 based on the identification information and/or configuration information. The power transfer contract may include the limits of parameters determining a power transfer characteristic in the power transfer phase 640.

The wireless power transmitter 100 may terminate the identification and configuration phase 630 and return to the selection phase 610 prior to entering the power transfer phase 640. For instance, the wireless power transmitter 100 may terminate the identification and configuration phase 630 to find another electronic device that can receive power in a wireless manner.

4) Power Transfer Phase

The wireless power transmitter 100 in the power transfer phase 640 transmits power to the electronic device 200. The wireless power transmitter 100 can receive a power control message from the electronic device 200 while transferring power, and control a characteristic of the power applied to the transmitting coil in response to the received power control message.

Figure 18:
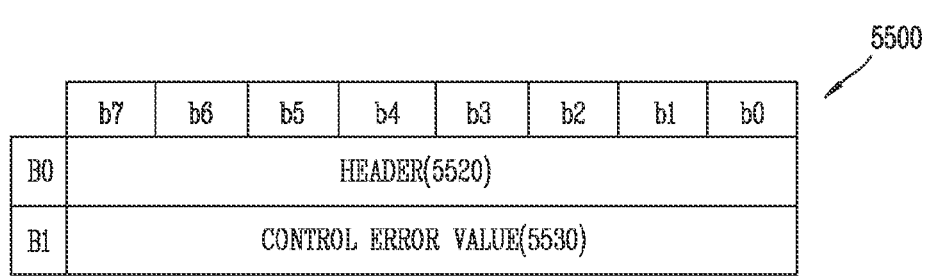

For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 can control the power applied to the transmitting coil according to the control error value. In other words, a current applied to the transmitting coil may be controlled so as to be maintained if the control error value is "0", reduced if the control error value is a negative value, and increased if the control error value is a positive value.

The wireless power transmitter 100 may monitor parameters within a power transfer contract generated based on the identification information and/or configuration information in the power transfer phase 640. As a result of monitoring the parameters, if power transmission to the electronic device 200 violates the limits included in the power transfer contract, then the wireless power transmitter 100 may cancel the power transmission and return to the selection phase 610.

The wireless power transmitter 100 can also terminate the power transfer phase 640 based on a power control message transferred from the electronic device 200. For example, if the charging of a battery has been completed while charging the battery using power transferred by the electronic device 200, then a power control message for requesting the suspension of wireless power transfer can be transferred to the wireless power transmitter 100. In this instance, the wireless power transmitter 100 can receive a message for requesting the suspension of the power transmission, and then terminate wireless power transfer, and return to the selection phase 610.

In another example, the electronic device 200 may transfer a power control message for requesting renegotiation or reconfiguration to update the previously generated power transfer contract. The electronic device 200 may transfer a message for requesting the renegotiation of the power transfer contract when it is required a larger or smaller amount of power than the currently transmitted power amount. In this instance, the wireless power transmitter 100 can receive a message for requesting the renegotiation of the power transfer contract, and then terminate contactless power transfer, and return to the identification and configuration phase 630.

Figures 19, 20:
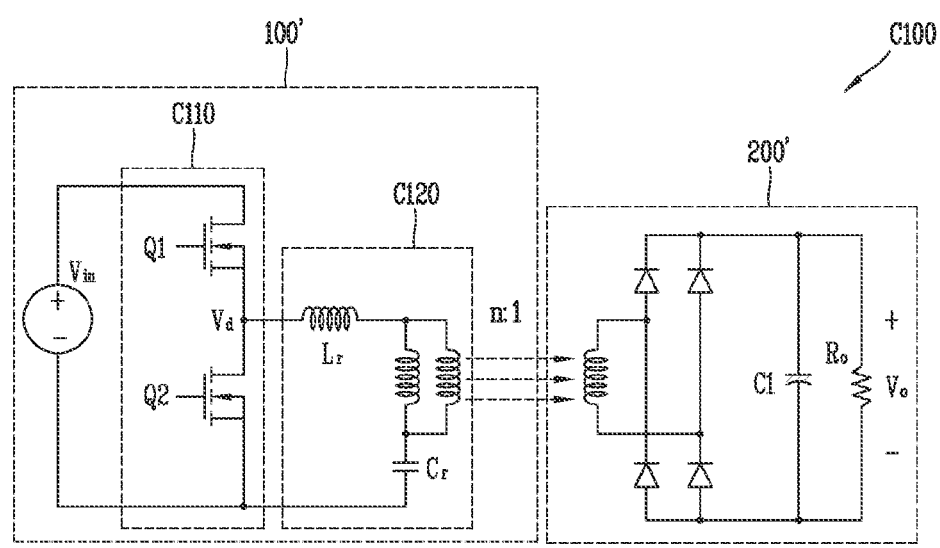
FIG. 20 is a view illustrating a structure of an LLC resonant converter.

Thus, a message transmitted by the electronic device 200, for instance, may be an end power transfer packet 5600 as illustrated in FIG. 19. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Hereinafter, description will be given of a wireless power transmitter having a function of adjusting a wireless power transmission gain, and a wireless power transmitting method thereof, with reference to FIGS. 20 to 22.

Method of Adjusting Wireless Power Transmission Gain in Typical Wireless Power Transmission System Transmission gain of wireless power in a wireless power transmission system may have to be adjusted when there is the change in a load corresponding to a wireless power receiver. The wireless power transmission system is a general conception which includes the wireless power transmitter, the wireless power receiver, and a channel (air or the like) through which a wireless power signal is propagated.

The wireless power transmission gain is a generally-known meaning in this technical field. For example, the wireless power transmission gain may be at least one of a ratio between power transmitted by the wireless power transmitter and power received by the wireless power receiver, a ratio between a transmitting-side voltage of the wireless power transmitter and a receiving-side voltage of the wireless power receiver, and a ratio between a transmitting-side current of the wireless power transmitter and a receiving-side current of the wireless power receiver.

In general, the transmission gain may be expressed based on changes of transmission gains with respect to transmission frequencies. The changes of the transmission gains with respect to the transmission frequencies may be expressed in the form of a graph, and from this perspective, may be referred to as a transmission gain profile.

Based on the transmission gain profile, the wireless power transmitter may decide a transmission frequency corresponding to a wireless power signal for transferring power in a wireless manner. For example, once a target transmission gain is set, the wireless power transmitter may decide which transmission frequency has to be selected to transmit a wireless power signal to the wireless power receiver, based on the transmission gain profile.

Here, a load corresponding to the wireless power receiver is a generally-known meaning in this technical field. For example, the load may indicate an impedance corresponding to the wireless power receiver, power consumed by the wireless power receiver, or a quantity of receiving-end currents flowing along the wireless power receiver.

The load may be changed by various ways, for example, when the number of wireless power receivers connected to the wireless power transmitter is changed, when the load of the wireless power receiver is changed due to external causes (for instance, the change in a quantity of power required to be received), and the like.

The use of the transmission gain adjustment will now be described. When the load is changed due to a specific cause, the wireless power transmission gain may be changed. This is because a Q value is changed in response to the change of the load, and a shape of the transmission gain profile is changed due to the change of the Q value, which may result in the change in transmission gain at a current transmission frequency.

Hence, since there is generally a target transmission gain at the moment of the wireless power transfer in the wireless power transfer system, when the change in the transmission gain is caused due to the change of the load, the transmission gain is preferably adjusted such that the changed transmission gain can be recovered to the target transmission gain. The transmission gain adjustment may be achieved simply by adjusting the transmission frequency.

Hereinafter, a method of adjusting wireless power transmission gain by an adjustment of a transmission frequency will be described with reference to FIGS. 20 to 22. In general, a wireless power transfer system may serve as a resonant converter from the perspective of transferring power in a wireless manner. The resonant converter uses a resonant tank for power conversion, and is widely used by virtue of various advantages, such as high efficiency, a small size, and the like.

Hereinafter, description will be given of the wireless power transfer system from the perspective of a function as the resonant converter. In one example, the resonant converter may indicate only a wireless power transmitter.

For a currently-used resonant converter, when the load corresponding to the wireless power receivers is changed, a switching frequency of the resonant converter (or an operational frequency of the wireless power transmitter) may responsively be changed to maintain a predetermined transmission gain value. The switching frequency may be a frequency which is the same as or similar to a frequency of a wireless power signal generated by the wireless power transmitter.

The resonant converter may be various in form or type. For instance, the resonant converter may be an LLC resonant converter, a serial-type resonant converter or a parallel-type resonant converter.

FIG. 20 is a view illustrating a structure of an LLC resonant converter. As illustrated in FIG. 20, an LLC resonant frequency C100 may cover a wide range of input voltages and output loads and reduce magnetic elements by virtue of using leakage inductance of a transformer as a resonant inverter. As aforementioned, it should be noticed that the LLC resonant converter may indicate only the function of the wireless power transmitter side (or a primary side 100'). Hereinafter, description will be given of an example that the LLC resonant converter C100 indicates the whole wireless power system (a concept including both 100' and 200').

The LLC resonant converter converts a DC input voltage (or a DC signal, Vin) into an AC signal (or an AC current, Ir) based on a switching operation by a switching unit C110 (including Q1 and Q2). The switching unit C110 may correspond to the inverter 1112 included in the power conversion unit 111 of the wireless power transmitter 100.

The switching unit C110 can receive a driving signal input from the exterior (for example, the power transmission control unit 180 or the controller 180). The driving signal may be applied to switching elements Q1 and Q2, thereby controlling the switching unit C110 to execute a switching operation. The AC signal Ir may be a signal corresponding to a carrier signal as the AC waveform, which is generated by the inverter 1112.

The carrier signal may drive (operate) a vibration circuit C120. This may allow the wireless power signal to be generated from the transmitting coil 1111. That is, the wireless power signal may be generated based on the carrier signal.

The vibration circuit C120 may refer to a resonant circuit. The resonant circuit C120 may correspond to a passive element (inductor, capacitor or other resistance elements), which can generate resonance, and the transmitting coil 1111a for an inductance method, or to the resonant generation circuit 1116 and the transmitting coil 1111b for a resonance method.

Therefore, a wireless power receiver side 200' (or a secondary side) can receive the wireless power signal through the receiving coil 2911, and receive power in a wireless manner based on the wireless power signal so as to (re)charge a battery. The battery and the like may correspond to load resistance Ro. The LLC resonant converter C100 is generally known in the technical field, so a detailed operation thereof will not be described.

Hereinafter, description will be given of a transmission gain adjustment in the LLC resonant converter C100, with reference to FIGS. 21 and 22. FIG. 21 illustrates the change in transmission gain according to a transmission frequency in the LLC resonant converter.

Figure 21:
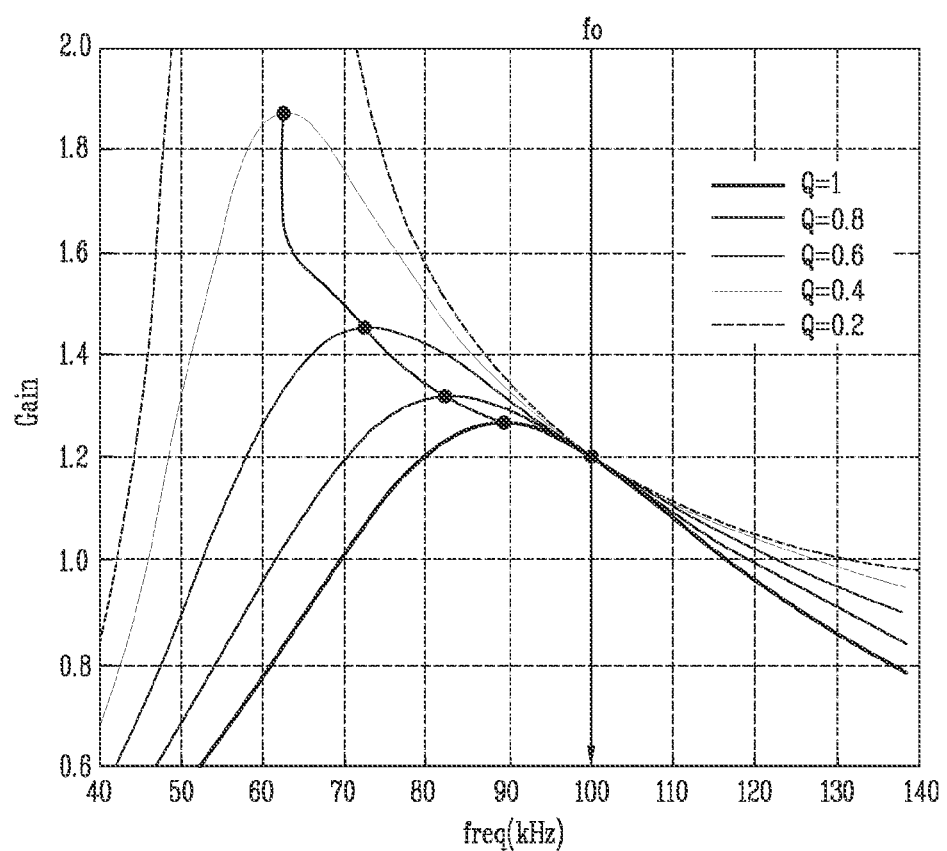
FIG. 21 is a view illustrating the change in transfer gain according to a transmission frequency in the LCC resonant converter.

In particular, a characteristic of a transmission gain profile according to a transmission frequency in the LLC resonant convert C100 can be understood as illustrated in FIG. 21. A switching operation of the LLC resonant converter C100 can be controlled by decreasing a switching frequency (or an operational frequency of the driving signal or a transmission frequency corresponding to the wireless power signal) when the load is increased in an inductive region, and increasing the switching frequency when the load is decreased.

That is, when the load Ro corresponding to the wireless power receiver 200' is decreased, a Q value may be decreased. An increase in the transmission gain due to the decrease of the Q value may be prevented by decreasing the switching frequency. Also, when the load Ro is increased, the Q value may be increased. A decrease of the transmission gain due to the increase in the Q value may be prevented by increasing the switching frequency.

However, the relationship between the load and the transmission gain can depend on an operation state of the resonant converter. That is, according to the operation state of the resonant converter, the switching frequency may be increased or decreased when the load is decreased.

Figure 22:
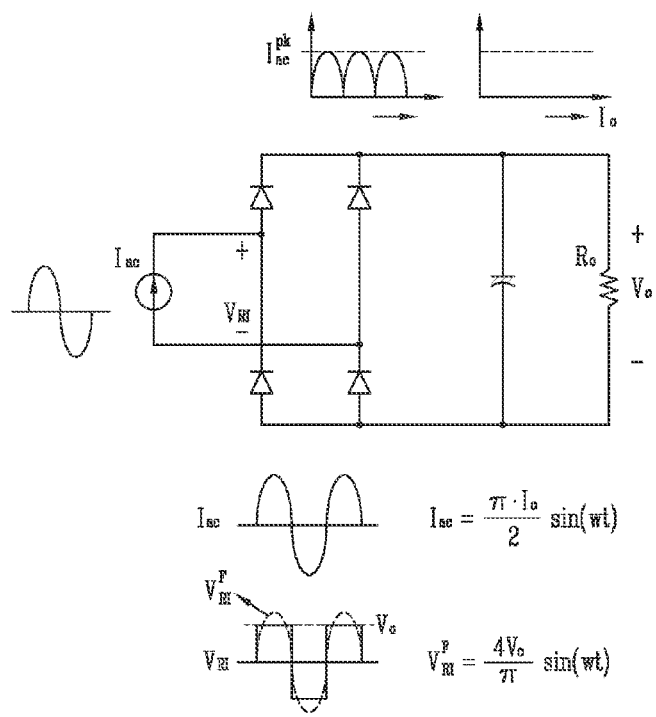
FIG. 22 is a view illustrating first harmonic approximation (FHA) of the LLC resonant converter.

FIG. 22 is a view illustrating a first harmonic approximation (FHA) of the LLC resonant converter. As illustrated in FIG. 22, assuming that the LLC resonant converter C100 employs a first harmonic approximation (FHA) such that only a fundamental frequency component of a square-wave voltage input to a resonant network (or a resonant circuit) of the primary side 100' (or the wireless power transmitter side) contributes to an energy transfer, when the load Ro is changed, the Q value is eventually changed. Therefore, a switching frequency may be varied to maintain the transmission gain.

Here, the Q value may be calculated by the following Equations 2 and 3.

$$R_{ac} = \frac{V_{RI}^F}{I_{ac}^F} = \frac{8n^2}{\pi^2} R_o \quad \text{(Equation 2)}$$

$$Q = \frac{\sqrt{L_r/C_r}}{R_{ac}} \quad \text{(Equation 3)}$$

Figure 23:
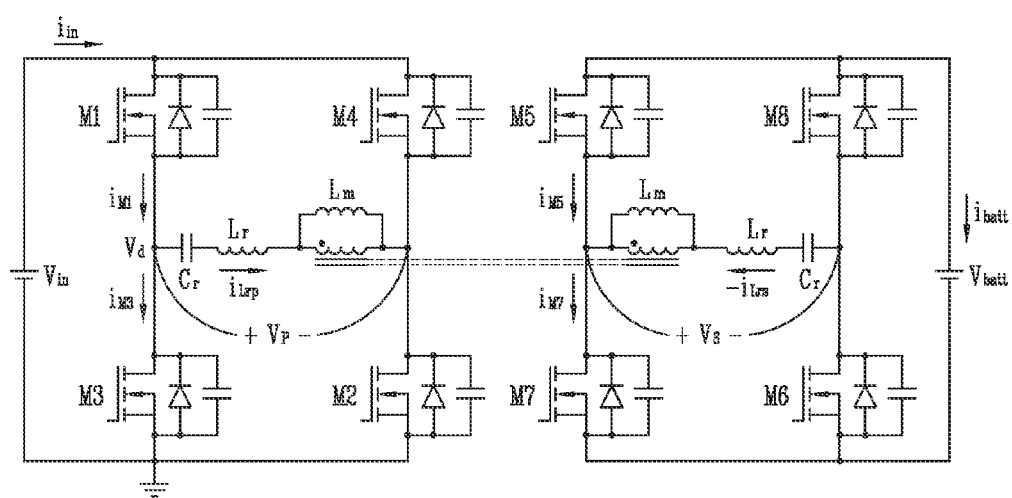
FIG. 23 is a view illustrating a structure of a bidirectional resonant converter in accordance with an embodiment disclosed herein.

FIG. 23 is a view illustrating a structure of a bidirectional resonant converter in accordance with an embodiment disclosed herein. As illustrated in FIG. 23, a bidirectional resonant converter may be applied to a resonance-type wireless power transmitter 100 and an electric vehicle or an electronic device 200.

A bidirectional resonant converter included in the wireless power transmitter 100 may include a first resonant converter (primary side) provided with a first inverter (M1 to M4) that executes a switching operation according to a PWM control signal, first resonant circuits Lr and Cr, and a transmission coil (Tx coil) Lm, and a second resonant converter (secondary side) provided with a second inverter (M5 to M8) that executes a switching operation according to the PWM control signal, second resonant circuits Lr and Cr, and a receiving coil (Rx coil) Lm. The second resonant converter may be included in an electric vehicle or the electronic device 200.

Switching elements M1 to M4 included in the first inverter may be connected in the form of a bridge circuit, and each switching element M1 to M4 may be connected in parallel with a body diode and a condenser. Switching elements M5 to M8 included in the second inverter may also be connected in the form of the bridge circuit, and each switching element M5 to M8 may be connected in parallel with a body diode and a condenser.

The first inverter may include first and third switching elements M1 and M3 connected with each other in series, and second and fourth switching elements M2 and M4 connected with each other in series and connected in parallel with the first and third switching elements M1 and M3. The first resonant circuit and the transmitting coil may be connected in series to a point between the first and third switching elements M1 and M3 and a point between the second and fourth switching elements M2 and M4.

The second inverter may include fifth and seventh switching elements M5 and M7 connected with each other in series, and sixth and eighth switching elements M6 and M8 connected with each other in series and connected in parallel with the fifth and seventh switching elements M5 and M7. The second resonant circuit and the receiving coil may be connected in series to a point between the fifth and seventh switching elements M5 and M7 and a point between the sixth and eighth switching elements M6 and M8. An operational frequency of the first and/or second inverter(s) may be in the range of 19 kHz-21 kHz, 59 kHz-61 kHz, and 81.38 kHz-90 kHz.

Figure 24:
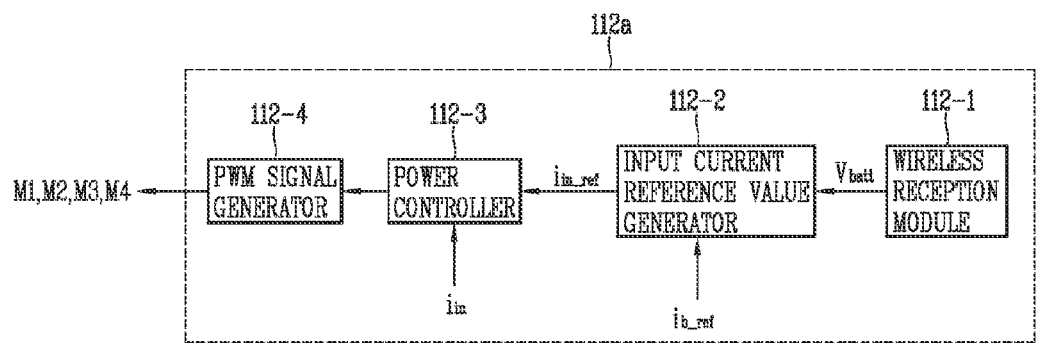
FIGS. 24 and 25 are configuration views of a power transmission control unit that controls a bidirectional resonant converter in accordance with an embodiment disclosed herein.
Figure 25:
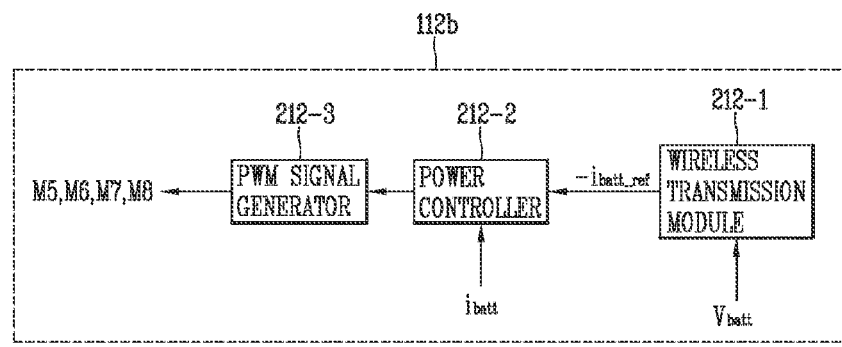

FIGS. 24 and 25 are configuration views of a power transmission control unit that controls a bidirectional resonant converter in accordance with an embodiment disclosed herein. As illustrated in FIGS. 24 and 25, the power transmission control unit 112 may include a first controller 112a that controls the first resonant converter in a charging mode, and a second controller 112b that controls the second resonant converter in a discharging mode.

For example, the power transmission control unit 112 may apply a driving signal (PWM signal) for driving the inverter (M1~M4) to the inverter (M1~M4) in the charging operation mode, and apply a driving signal (PWM signal) for driving the inverter (M5~M8) to the inverter (M5~M8) in the discharging mode.

The first controller 112a includes a wireless reception module 112-1 that receives battery voltage information corresponding to a voltage value $V_{batt}$ of the battery 299 in real time through a wireless network, an input current reference value generator 112-2 that generates an input current reference value $i_{in\_ref}$ based on the voltage value $V_{batt}$ of the battery, a reference current value $i_{batt\_ref}$ for the battery charging and an input voltage $V_{in}$, a current controller 112-3 that compares the input current reference value $i_{in\_ref}$ with a currently-measured input current value $i_{in}$ and decides a battery charging current value for compensating for a difference (error) according to the comparison result, and a PWM signal generator 112-4 that generates a PWM signal corresponding to the battery charging current value and applies the PWM signal to the inverter (M1~M4) as a driving signal for driving the inverter (M1~M4). The PWM signal generator 112-4 can generate the PWM signal, which includes a gate signal for controlling a duty ratio of the switching elements M1 to M4, based on the battery charging current value.

The second controller 112b includes a wireless transmission module 212-1 that transmits battery voltage information corresponding to the voltage value $V_{batt}$ of the battery 299 to the wireless reception module 112-1 in real time through a wireless network, a current controller 212-2 that compares a reference current value $i_{batt\_ref}$ of the battery with a currently-measured measured current value $i_{batt}$ of the battery and decides a battery discharging current value for compensating for the difference (error) according to the comparison result, and a PWM signal generator 212-3 that generates a PWM signal corresponding to the battery discharging current value and applies the PWM signal to the inverter (M5~M8) as a driving signal for driving the inverter (M5~M8). The PWM signal generator 212-3 can generate the PWM signal, which includes a gate signal for controlling a duty ratio of the switching elements M5 to M8, based on the battery discharge current value.

Figure 26:
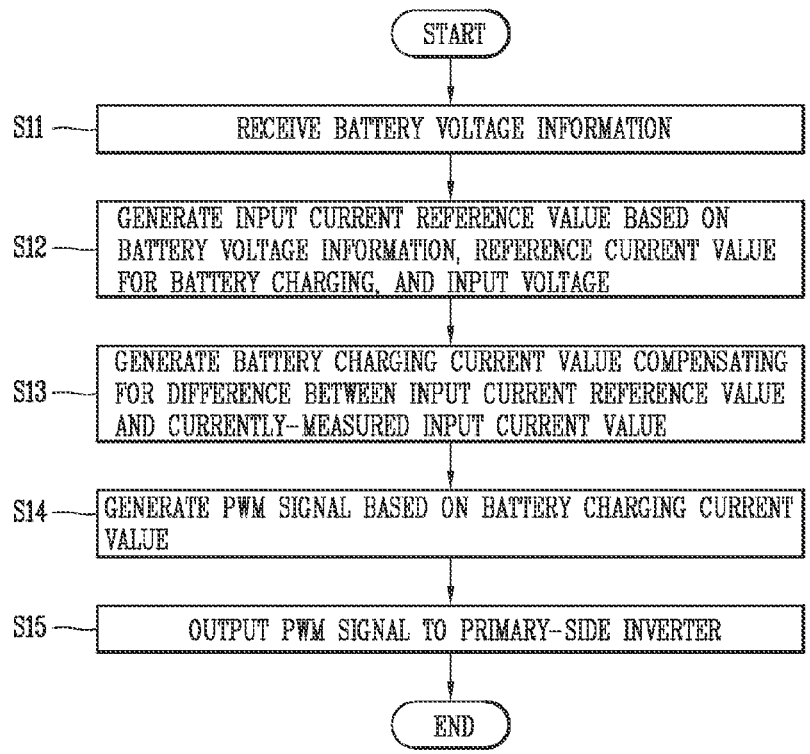
FIG. 26 is a flowchart illustrating a wireless power transfer method in a charging mode in accordance with an embodiment disclosed herein.

FIG. 26 is a flowchart illustrating a wireless power transfer method in a charging mode in accordance with an embodiment disclosed herein. First, the wireless reception module 112-1 can receive battery voltage information (voltage value) corresponding to the voltage value $V_{batt}$ of the battery 299 in real time through a wireless network, and output the received voltage information to the input current reference value generator 112-2 (S11).

The input current reference value generator 112-2 can generate an input current reference value $i_{in\_ref}$ based on the voltage value $V_{batt}$ corresponding to the voltage information, a reference current value $i_{batt\_ref}$ for charging the battery, and an input voltage $V_{in}$, and output the generated input current reference value $i_{in\_ref}$ to the current controller 112-3 (S12). That is, the limitation of communication speed of the primary side and the secondary side may be overcome by using voltage information with a slow dynamic response instead of using current information of the battery, and also a secondary-side converter may be simplified into a single-stage structure by allowing the primary side to directly control a secondary-side charging current.

For example, the control of the charging/discharging current indicates the control of the secondary-side battery current. Hence, upon controlling the primary side, battery current information has to be transferred from the secondary side to the primary side in real time through wireless communication. However, a real time control may be made difficult due to low communication speed. To overcome this, instead of using current information of the secondary-side battery, secondary-side battery voltage information with a relatively slow dynamic response may be sent to the primary side through wireless communication, so as to allow the primary side to control the secondary-side charging current, which is desired to be charged, based on the corresponding voltage information and voltage information obtained by the primary side in a sensing manner. That is, the input current reference generator 112-2 may calculate the input current reference value $i_{in\_ref}$ by the following Equation 4.

$$I_{in_{ref}} = \frac{V_{batt} \times I_{batt_{ref}}}{V_{in}} \quad \text{(Equation 4)}$$

Here, $V_{batt}$ denotes the voltage value of the battery, $i_{in\_ref}$ denotes a reference current value for charging the battery, and $V_{in}$ denotes an input voltage (i.e., an input voltage of the primary side). That is, the input current reference value $i_{in\_ref}$ may be calculated as expressed by Equation 4. Once a battery voltage is informed, a desired battery charging current may be converted into a primary side current, such that the primary side current can be controlled. Since the battery voltage is not drastically changed, a charging control can be efficiently allowed merely by a slow wireless communication method.

The current controller 112-3 may compare the input current reference value $i_{in\_ref}$ with a currently-measured input current value $i_{in}$, generate (decide) a battery charging current value for compensating for a difference (error) according to the comparison result, and output the battery charging current value to the PWM signal generator 112-4 (S13).

The PWM signal generator 112-4 can generate a PWM signal corresponding to the battery charging current value, and apply the PWM signal to the inverter (M1~M4) as a driving signal for driving the inverter (M1~M4) (S14 and S15).

Figure 27:
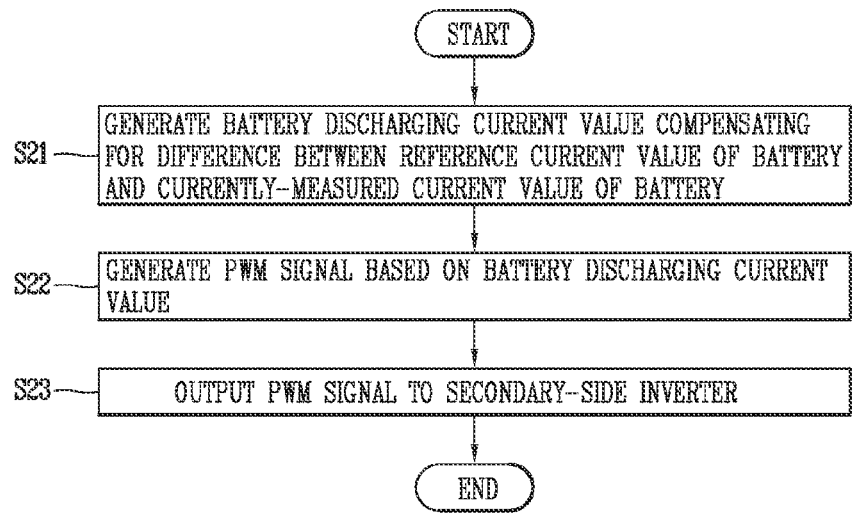
FIG. 27 is a flowchart illustrating a wireless power transfer method in a discharging mode in accordance with an embodiment disclosed herein.

FIG. 27 is a flowchart illustrating a wireless power transfer method in a discharging mode in accordance with an embodiment disclosed herein. First, the current controller 212-2 may compare a reference current value $i_{batt\_ref}$ the battery with a currently-measured measured current value $i_{batt}$ in the discharging mode, generate (decide) a battery discharging current value for compensating for a difference (error) according to the comparison result, and output the battery discharging current value to the PWM signal generator 212-3 (S21).

The PWM signal generator 212-3 can generate a PWM signal corresponding to the battery discharging current value, and apply the PWM signal to the inverter (M5~M8) as a driving signal for driving the inverter (M5~M8) (S22 and S23). The PWM signal generator 212-3 can generate the PWM signal, which includes a gate signal for controlling a duty ratio of the switching elements M5 to M8, based on the battery discharging current value.

Hereinafter, an operation of the bidirectional resonant converter will be described under assumption of $f_s = f_{r2}$ having the maximum gain G (jω). A charging direction will merely be described because the charging direction and a discharging direction are symmetrical to each other.

Figure 28:
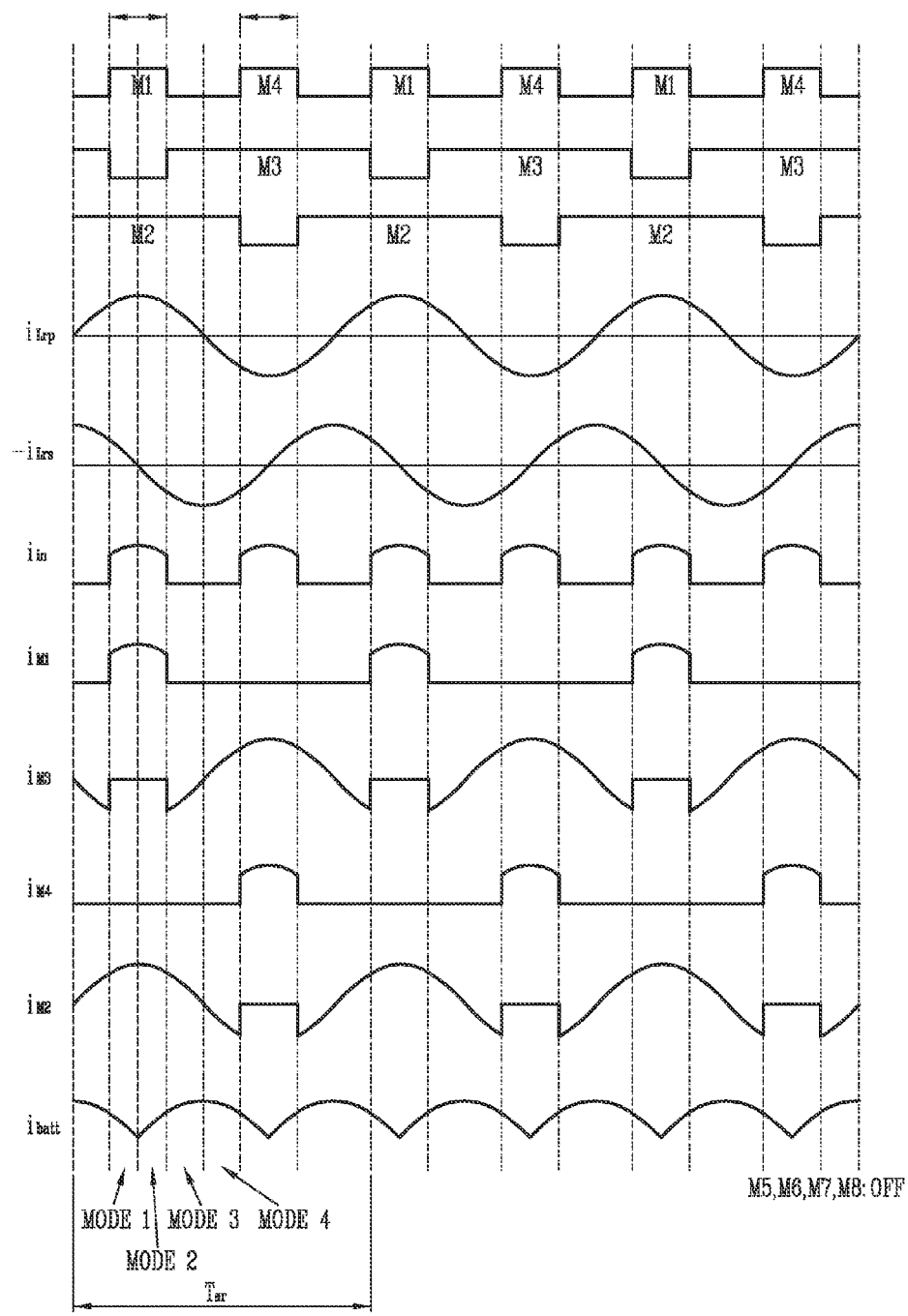
FIGS. 28 and 29 are views illustrating operation wavelengths during charging and discharging.
Figure 29:
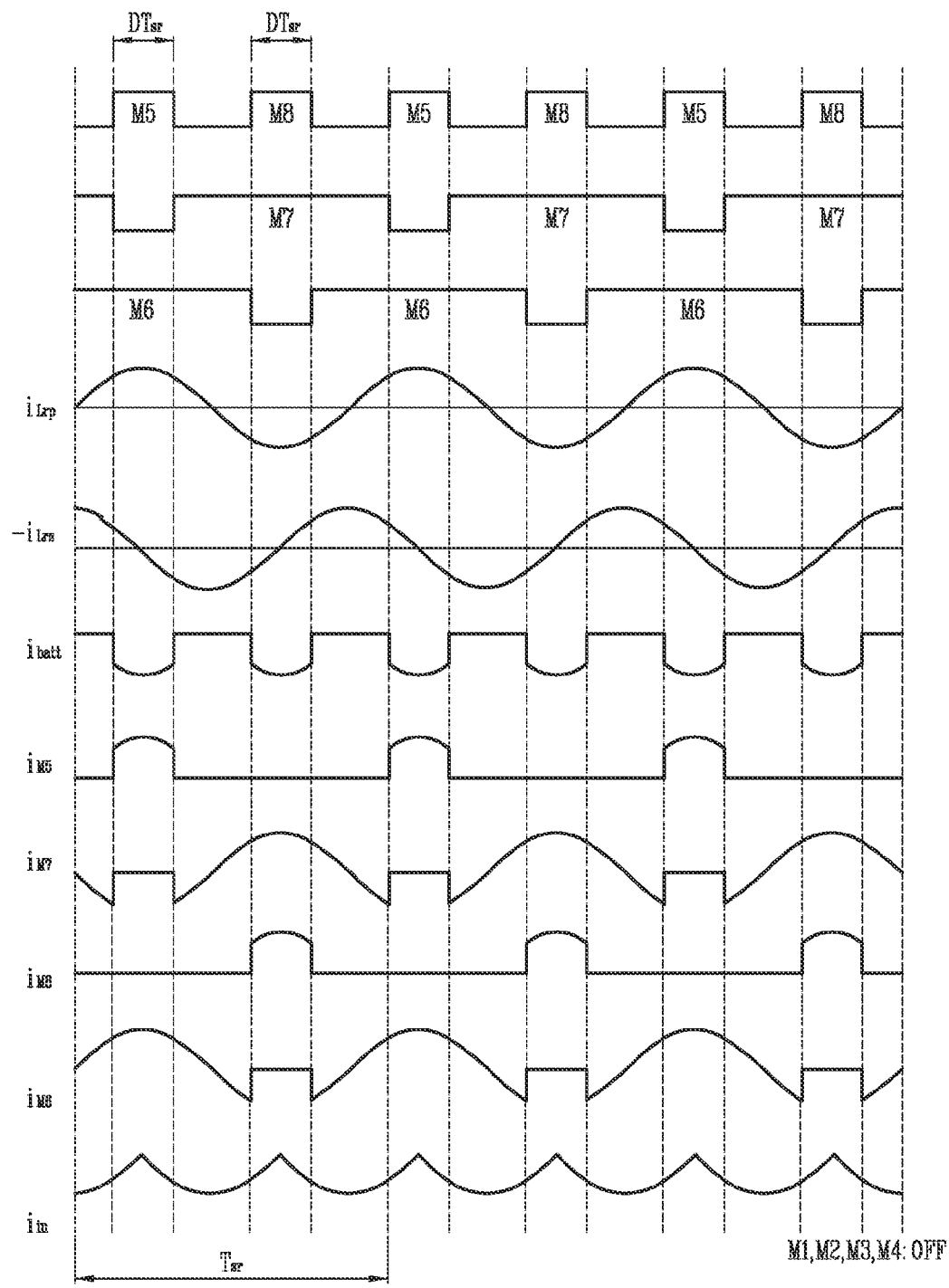

FIGS. 28 and 29 are views illustrating operating wavelengths during charging and discharging. As illustrated in FIGS. 28 and 29, during a charging operation, $M_1$ and $M_4$ may operate with varying a duty ratio (D) thereof. A reversal signal of $M_1$ may be applied to $M_3$, and a reversal signal of $M_4$ may be applied to $M_2$. Also, during a discharging operation, $M_5$ and $M_g$ may operate with varying a duty ratio (D) thereof. A reversal signal of $M_g$ may be applied to $M_6$ and a reversal signal of $M_5$ may be applied to $M_7$.

A switch without displaying a signal may be turned off, with only a body diode of the switch activated. For instance, the first and second switching elements M1 and M2 may be turned on and the third and fourth switching elements M3 and M4 may be turned off for a first cycle (mode 1) of the PWM signal. The first and second switching elements M1 and M2 may be turned on and the third and fourth switching elements M3 and M4 may be turned off for a second cycle (mode 2) of the PWM signal.

The first and fourth switching elements M1 and M4 may be turned off and the second and third switching elements M2 and M3 may be turned on for a third cycle (mode 3) of the PWM signal. The first and fourth switching elements M1 and M4 may be turned off and the second and third switching elements M2 and M3 may be turned on for a fourth cycle (mode 4) of the PWM signal. The first to fourth cycles may correspond to a half cycle.

Each turn-on/off operation of the first and fourth switching elements M1 and M4 is a hard switching operation. Thus, it can be noticed that the first and fourth switching elements M1 and M4 have short conducting intervals and occupy most of switching loss of the first inverter. Also, each turn-on/off operation of second and third switching elements M2 and M3 is a soft switching operation. Thus, it can be noticed that each of the second and third switching elements M2 and M3 rarely exhibits a switching loss and has a long conducting interval (occupying most of conducting loss of the first inverter).

Therefore, if using the first and fourth switching elements M1 and M4 which are designed to minimize the conducting loss and the second and third switching elements M2 and M3 which are designed to minimize the switching loss, the wireless power transfer system may have improved efficiency.

The fifth and sixth switching elements M5 and M6 may be turned on and the seventh and eighth switching elements M7 and M8 may be turned off for a first cycle (mode 1) of the PWM signal. The fifth and sixth switching elements M5 and M6 may be turned on and the seventh and eighth switching elements M7 and M8 may be turned off for a second cycle (mode 1) of the PWM signal. The fifth and eighth switching elements M5 and M8 may be turned off and the sixth and seventh switching elements M6 and M7 may be turned on for a third cycle (mode 3) of the PWM signal. The fifth and eighth switching elements M5 and M8 may be turned off and the sixth and seventh switching elements M6 and M7 may be turned on for a fourth cycle (mode 4) of the PWM signal. The first to fourth cycles may correspond to a half cycle.

Figure 30:
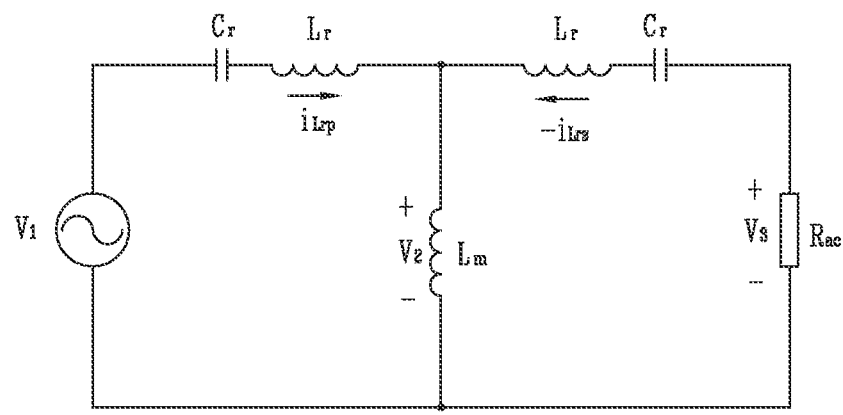
FIG. 30 is a view illustrating an equivalent circuit of a bidirectional resonant converter in accordance with an embodiment disclosed herein.

FIG. 30 is a view illustrating an equivalent circuit of a bidirectional resonant converter in accordance with an embodiment disclosed herein, which illustrates an equivalent circuit when it is assumed that a turn ratio of a transformer within a bidirectional resonant converter is 1:1. Here, $V_1$ denotes a fundamental component (or a fundamental frequency component) of a primary-side inverter voltage $V_p$, and $V_3$ denotes a fundamental component of a secondary-side inverter voltage $V_2$, which may be defined as expressed by Equations 5 and 6.

$$V_1(t) = \left(\frac{4V_{in}}{\pi}\sin D\pi\right)\cos\omega_s t \quad \text{(Equation 5)}$$

$$V_3(t) = \frac{4V_0}{\pi}\cos\omega_s t \quad \text{(Equation 6)}$$

Also, $R_{ac}$ denotes AC resistance of equivalent resistance ($R_0$) of an output end and may be calculated as expressed by Equation 7.

$$R_{ac} = \frac{8}{\pi^2}R_0 \quad \text{(Equation 7)}$$

A relationship between an input voltage and a battery voltage may be obtained using the equivalent circuit, as expressed by Equation 8.

$$\frac{V_{batt}}{V_{in}} = \sin D\pi |G(j\omega)| \quad \text{(Equation 8)}$$

Here, $G(j\omega)$ may be defined as expressed by Equation 9.

$$G(j\omega) = \frac{-\omega^3 L_m C_r^2 R_{ac}}{\omega C_r(1 - \omega^2 C_r(L_m + L_r))R_{ac} +} \quad \text{(Equation 9)}$$
$$j(1 - \omega^2 L_r C_r)(\omega^2 L_r C_r + 2\omega^2 L_m C_r - 1)$$

Here, $\omega$ is $2\pi f_s$. Even if it is designed under the condition of $f_s = f_{r2}$, the entire gain is limited according to the duty ratio (D) and a gain variation is corrected due to the variation of the duty ratio. Therefore, a parameter variation is insensible. As illustrated in FIGS. 28 and 29, it can be seen that a pulse-type current is flowing along the high-side switches M1, M4, M5 and M8, and the low-side switches M2, M3, M6 and M7 are executing zero-voltage switching and zero-current switching.

A primary-side resonant current $I_{Lrp}(j\omega)$ and a secondary-side resonant current $-I_{Lrs}(j\omega)$ according to the input voltage may be calculated by Equations 10 and 11.

$$I_{Lrp}(j\omega) = \frac{[\omega C_r(1 - \omega^2 C_r(L_r + L_m)) + j\omega^2 C_r^2 R_{ac}]}{\omega C_r(1 - \omega^2 C_r(L_m + L_r))R_{ac} +} \quad \text{(Equation 10)}$$
$$j(1 - \omega^2 L_r C_r)(\omega^2 L_r C_r + 2\omega^2 L_m C_r - 1)$$
$$\left(\left(\frac{4V_{in}}{\pi}\sin D\pi\right)\cos\omega t\right)$$

$$-I_{Lrs}(j\omega) = \frac{-j\omega^3 C_r^2 L_m}{\omega C_r(1 - \omega^2 C_r(L_m + L_r))R_{ac} +} \quad \text{(Equation 11)}$$
$$j(1 - \omega^2 L_r C_r)(\omega^2 L_r C_r + 2\omega^2 L_m C_r - 1)$$
$$\left(\left(\frac{4V_{in}}{\pi}\sin D\pi\right)\cos\omega t\right)$$

As illustrated in FIG. 28, it can be noticed that $-I_{Lrs}$ is 90° ahead $((-j\omega)$ of $I_{Lrp}$ under $f_s = f_{r2}$ and a rectified value of $-I_{Lrs}$ is the battery charging current. The interpretation of the operation based on such structure and an operation mode is illustrated in FIGS. 31A to 31D.

Figure 31A:
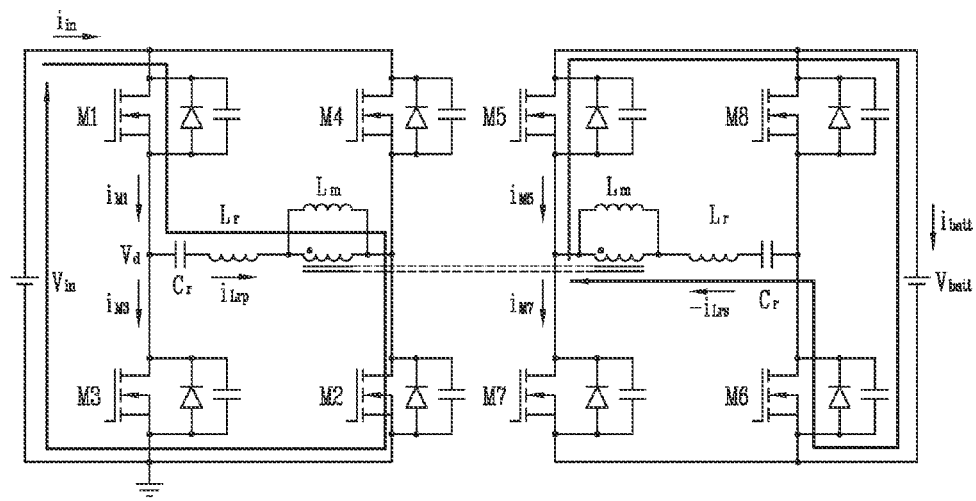
FIGS. 31A to 31D are views illustrating an operation mode of the bidirectional resonant converter in accordance an embodiment disclosed herein.

FIGS. 31A to 31D are views illustrating an operation mode of a bidirectional resonant converter in accordance an embodiment disclosed herein. As illustrated in FIG. 31A, when the switch M1 is turned on (continuity) in the mode (cycle) 1, since the switch M2 is already in a turn-on state, a charging current may flow to the battery through body diodes of the switches M5 and M6 as shown in the mode (cycle) 1. When the secondary-side current $-I_{Lrs}$ is lowered down to 0 in a resonant form, the mode (cycle) 2 may begin.

Figure 31B:
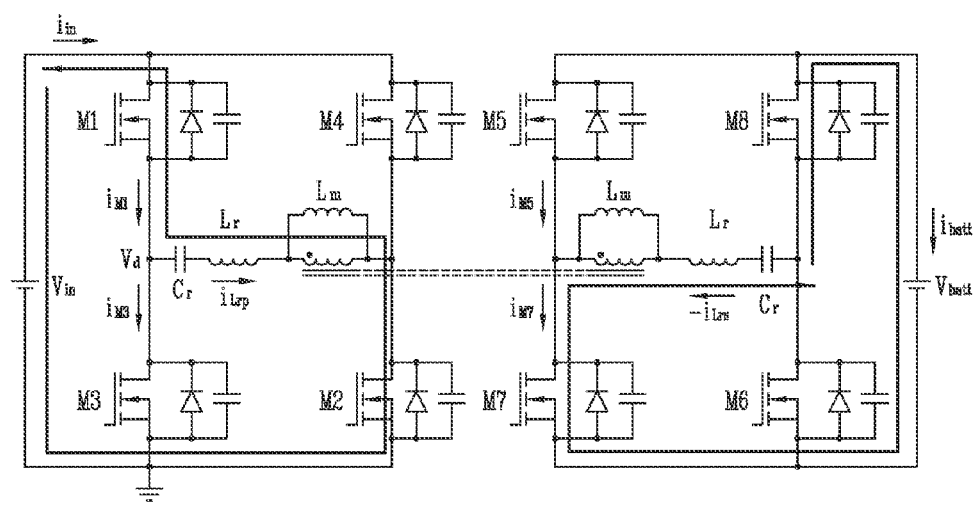

As illustrated in FIG. 31B, the switches M1 and M2 remain still in the turn-on state in the mode (cycle) 2 and $-I_{Lrs}$ is in a negative current state. Accordingly, the body diodes of the switches M7 and M8 may be turned on and the charging current may thus flow into the battery.

Figure 31C:
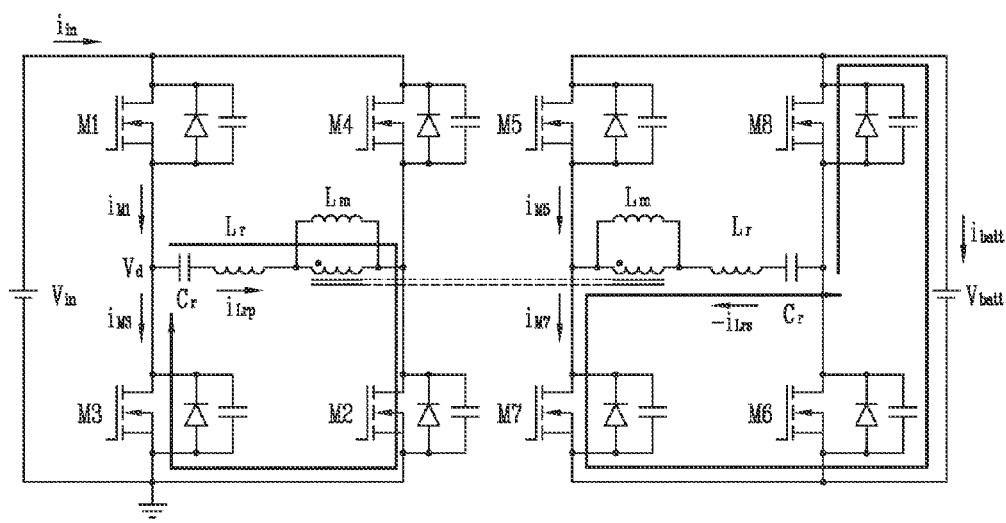
Figure 31D:
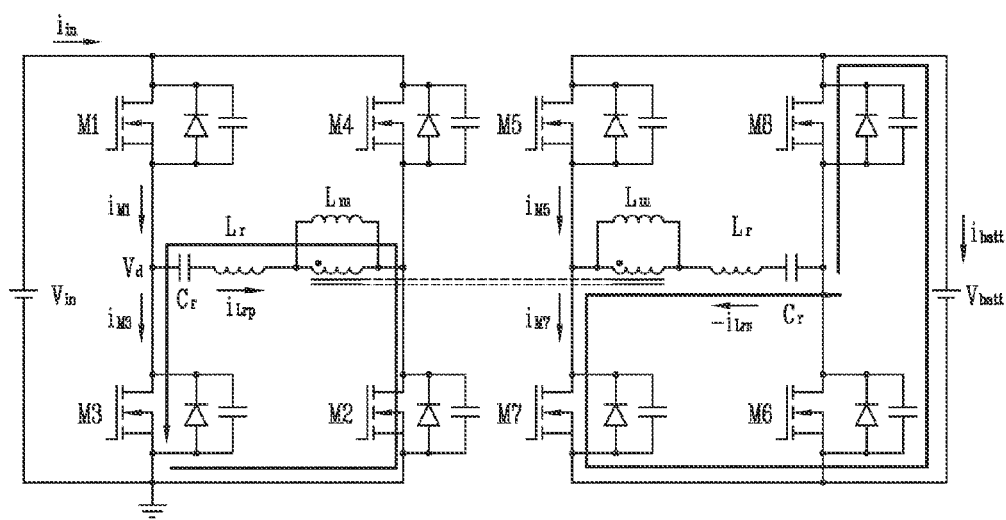

As illustrated in FIGS. 31C and 31D, when the switch M1 is turned off and the switch M3 is turned on in the mode (cycle) 3, the primary-side current flows through the body diodes of the switches M2 and M3 in the resonant form, and the secondary-side current $-I_{Lrs}$ remains still in the negative state. Accordingly, the charging current may flow into the battery. When $I_{Lrs}$ start to be converted into the negative state, since the switches M3 and M4 are still in the turn-on state in the mode (cycle) 4, a current path may be formed through the body diodes of the switches M3 and M2. Also, since $-I_{Lrs}$ is still in the negative state, the current path of the body diodes of the switches M7 and M8 may be maintained.

As described above, in accordance with embodiments disclosed herein, a bidirectional wireless power transmitter and a wireless power transfer method thereof allows for smooth bidirectional charging/discharging by controlling a resonant current using a PWM. Also, the control may be performed using information related to a switch which is required to be controlled. Also, slow wireless communication can be implemented by transmitting only a battery voltage of a secondary side to a primary side. Therefore, the present invention may be applicable to bidirectional chargers/dischargers of electric vehicles or other wireless power transfer fields.

The foregoing method may be implemented in a recording medium readable by a computer or its similar devices by employing, for example, software, hardware or some combinations thereof.

For a hardware implementation, the embodiments described herein may be implemented by using at least any one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein. For example, the foregoing methods may be implemented by the control unit (or Controller) 180 or power transmission control unit 112 in the wireless power transmitter 100.

For a software implementation, the embodiments such as procedures and functions disclosed herein may be implemented with separate software modules. Each of the software modules may perform one or more of the functions and operations described herein. Software codes may be implemented by using a software application written in a suitable programming language. The software codes may be stored in the memory 150 in the wireless power transmitter 100, and implemented by the control unit (or Controller) 180 or the power transmission control unit 112.

However, a wireless power transmitter according to the embodiment disclosed herein can be applicable to an apparatus, such as a docking station, a terminal cradle device, and an electronic device, and the like, excluding a case where it is applicable to only a wireless charger.

The scope of the invention is not limited to the embodiments disclosed herein, and thus various modifications, variations, and improvements can be made in the present invention without departing from the spirit of the invention, and within the scope of the appended claims.

What is claimed is:

1. A wireless power transmitter comprising:
a power supply unit configured to supply an input voltage;
a power conversion unit configured to generate wireless power based on a driving signal, generated by the supplied input voltage and a first pulse width modulation (PWM) signal, and transfer the wireless power to a wireless power receiver; and
a power transmission control unit configured to:
receive a voltage value of a battery charged with the wireless power through a wireless network, and
generate the first PWM signal based on the voltage value of the battery,
wherein the power transmission control unit is further configured to:
generate an input current reference value based on the voltage value of the battery, a reference current value for charging the battery, and the input voltage value,
generate a battery charging current value for compensating for a difference between the input current reference value and an input current value, and
generate the first PWM signal based on the battery charging current value.

2. The wireless power transmitter of claim 1, wherein the power transmission control unit is further configured to:
calculate the input current reference value by multiplying the voltage value of the battery and the reference current value for charging the battery, and
divide the multiplied value by the input voltage value.

3. The wireless power transmitter of claim 1, wherein the power transmission control unit comprises:
a wireless reception module configured to receive the voltage value of the battery, charged with the wireless power, in real time through the wireless network;
an input current reference value generator configured to generate the input current reference value based on the voltage value of the battery, the reference current value for charging the battery, and the input voltage value;
a first current controller configured to compare the input current reference value with a currently-measured input current value, and decide the battery charging current value for compensating for a difference according to the comparison result; and
a first PWM signal generator configured to generate the first PWM signal corresponding to the battery charging current value and apply the first PWM signal as the driving signal to the power conversion unit.

4. The wireless power transmitter of claim 3, wherein the power transmission control unit comprises:
a wireless transmission module configured to transmit the voltage value of the battery to the wireless reception module;
a second current controller configured to compare the reference current value of the battery with a currently-measured current value of the battery, and decide a battery discharging current value for compensating for a difference according to the comparison result; and
a second PWM signal generator configured to generate a second PWM signal corresponding to the battery discharging current value, and apply the second PWM signal to a power conversion unit of the wireless power receiver.

5. The wireless power transmitter of claim 4, wherein the power transmission control unit is further configured to generate the second PWM signal in a battery discharging mode.

6. The wireless power transmitter of claim 5, wherein the power conversion unit is implemented as a bidirectional resonant converter.

7. The wireless power transmitter of claim 6, wherein the bidirectional resonant converter comprises:
a first resonant converter including a first inverter executing a switching operation according to the first PWM signal, a first resonant circuit forming resonance according to the switching operation, and a transmitting coil transmitting the wireless power generated by the resonance of the first resonant circuit; and a second resonant converter including a second inverter executing a switching operation according to the second PWM signal, a second resonant circuit forming a resonance according to the switching operation of the second inverter, and a receiving coil receiving the wireless power by the resonance of the second resonant circuit.

8. The wireless power transmitter of claim 7, wherein each of the first and second inverters comprises:
first and second switching elements connected in series to each other; and
third and fourth switching elements connected in parallel with the first and second switching elements, and connected in series to each other,
wherein the first resonant circuit and the transmitting coil are connected in series to a point between the first and second switching elements and a point between the third and fourth switching elements,
wherein the first and fourth switching elements are turned on and the second and third switching elements are turned off for a first cycle of the PWM signal,
wherein the first and fourth switching elements are turned on and the second and third switching elements are turned off for a second cycle of the PWM signal,
wherein the first and third switching elements are turned off and the second and fourth switching elements are turned on for a third cycle of the PWM signal,
wherein the first and third switching elements are turned off and the second and fourth switching elements are turned on for a fourth cycle of the PWM signal, and
wherein the first to fourth cycles correspond to a half cycle.

9. The wireless power transmitter of claim 7, wherein the second resonant converter is applied to an electric vehicle or an electronic device.

10. A wireless power transfer method comprising:
receiving a voltage value of a battery of a wireless power receiver through a wireless network;
generating a first pulse width modulation (PWM) signal based on the voltage value of the battery;
generating wireless power based on a driving signal, generated by an input voltage and the first PWM signal; and
transferring the wireless power to the wireless power receiver,
wherein the generating of the first PWM signal comprises:
generating an input current reference value based on the voltage value of the battery, a reference current value for charging the battery, and the input voltage value;
generating a battery charging current value for compensating for a difference between the input current reference value and an input current value; and
generating the first PWM signal based on the battery charging current value.

11. The method of claim 10, wherein the generating of the first PWM signal is performed in a battery charging mode.

12. The method of claim 10, wherein the generating of the input current reference value includes calculating the input current reference value by multiplying the voltage value of the battery and the reference current value for charging the battery, and dividing the multiplied value by the input voltage value.

13. The method of claim 10, further comprising:
receiving, via a wireless reception module, the voltage value of the battery, charged with the wireless power, in real time through the wireless network;
generating, via an input current reference value generator, the input current reference value based on the voltage value of the battery, the reference current value for charging the battery, and the input voltage value;
comparing, via a first current controller, the input current reference value with a currently-measured input current value, and deciding the battery charging current value for compensating for a difference according to the comparison result; and
generating, via a first PWM signal generator, the first PWM signal corresponding to the battery charging current value and applying the first PWM signal as the driving signal to the power conversion unit.

14. The method of claim 13, further comprising:
transmitting, via a wireless transmission module, the voltage value of the battery to the wireless reception module;
comparing, via a second current controller, the reference current value of the battery with a currently-measured current value of the battery, and deciding a battery discharging current value for compensating for a difference according to the comparison result; and
generating, via a second PWM signal generator, a second PWM signal corresponding to the battery discharging current value, and applying the second PWM signal to a power conversion unit of the wireless power receiver.

15. The method of claim 14, further comprising:
generating the second PWM signal in a battery discharging mode.

16. The method of claim 15, wherein the generating the wireless power is performed using a bidirectional resonant converter.

17. The method of claim 16, wherein the bidirectional resonant converter comprises:
a first resonant converter including a first inverter executing a switching operation according to the first PWM signal, a first resonant circuit forming resonance according to the switching operation, and a transmitting coil transmitting the wireless power generated by the resonance of the first resonant circuit; and
a second resonant converter including a second inverter executing a switching operation according to the second PWM signal, a second resonant circuit forming a resonance according to the switching operation of the second inverter, and a receiving coil receiving the wireless power by the resonance of the second resonant circuit.

18. The method of claim 17, wherein each of the first and second inverters comprises:
first and second switching elements connected in series to each other; and
third and fourth switching elements connected in parallel with the first and second switching elements, and connected in series to each other,
wherein the first resonant circuit and the transmitting coil are connected in series to a point between the first and second switching elements and a point between the third and fourth switching elements,
wherein the first and fourth switching elements are turned on and the second and third switching elements are turned off for a first cycle of the PWM signal,
wherein the first and fourth switching elements are turned on and the second and third switching elements are turned off for a second cycle of the PWM signal,
wherein the first and third switching elements are turned off and the second and fourth switching elements are turned on for a third cycle of the PWM signal, wherein the first and third switching elements are turned off and the second and fourth switching elements are turned on for a fourth cycle of the PWM signal, and
wherein the first to fourth cycles correspond to a half cycle.

* * * * *